(12) United States Patent
Haas et al.

(10) Patent No.: US 12,596,208 B2
(45) Date of Patent: Apr. 7, 2026

(54) FREEFORM OPTICS FOR OPTICAL WIRELESS COMMUNICATIONS

(71) Applicant: pureLiFi Limited, Edinburgh (GB)

(72) Inventors: Harald Ulrich Haas, Edinburgh (GB); Janis Sperga, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

(21) Appl. No.: 18/864,664

(22) PCT Filed: May 12, 2023

(86) PCT No.: PCT/GB2023/051249
§ 371 (c)(1),
(2) Date: Nov. 11, 2024

(87) PCT Pub. No.: WO2023/218205
PCT Pub. Date: Nov. 16, 2023

(65) Prior Publication Data
US 2025/0258322 A1     Aug. 14, 2025

(30) Foreign Application Priority Data
May 13, 2022    (GB) ..................................... 2207040

(51) Int. Cl.
*H04B 10/11* (2013.01)
*G02B 3/08* (2006.01)

(52) U.S. Cl.
CPC .............. *G02B 3/08* (2013.01); *H04B 10/11* (2013.01)

(58) Field of Classification Search
CPC ........................ G02B 3/08; G02B 2003/0093; G02B 3/0081; G02B 3/04; H04B 10/11
See application file for complete search history.

(56) References Cited

U.S. PATENT DOCUMENTS 5,966,232 A * 10/1999 Kimura .................. G02B 26/10
                                                           359/205.1
9,912,412 B2 * 3/2018 Shatz .................... H04W 8/005
                    (Continued)

FOREIGN PATENT DOCUMENTS

CN        106130631        2/2019
GB         2558792         7/2019
                    (Continued)

OTHER PUBLICATIONS

Wajtanowski et al., "Optical design of transmitter lens for asymmetric distributed free space optical networks", Optical and Lasery Technology, vol. 101, pp. 319-327 (Year: 2018).*
                    (Continued)

*Primary Examiner* — Tanya T Motsinger
(74) *Attorney, Agent, or Firm* — SNELL & WILMER L.L.P.

(57)        ABSTRACT

An optical wireless communications (OWC) receiver is configured for receiving light encoded with one or more data signals from one or more light sources of one or more OWC transmitters and for generating one or more electrical signals which are representative of the received light. The OWC receiver comprises a photodetector configured to generate the one or more electrical signals, a freeform optical component comprising a plurality of lenslets, each lenslet comprising a corresponding lenslet optical surface, wherein at least one of the lenslet optical surfaces is translationally and cylindrically asymmetric, wherein the freeform optical component comprises a three-dimensional freeform optical surface which includes the lenslet optical surfaces, and wherein the freeform optical component and the photodetector are configured so that the freeform optical component directs at least a portion of the light that is incident on the freeform optical component from the light source onto the photode-
                    (Continued)

tector. An OWC transmitter and an OWC system are also disclosed.

32 Claims, 9 Drawing Sheets

(56)                    References Cited

U.S. PATENT DOCUMENTS

| 2004/0070855 A1* | 4/2004 | Benitez | G02B 19/0061 |
| | | | 359/858 |
| 2006/0076473 A1* | 4/2006 | Wilcken | H04B 10/1121 |
| | | | 250/214 A |
| 2015/0036114 A1* | 2/2015 | Schadt | F21V 7/0083 |
| | | | 362/241 |
| 2018/0157058 A1* | 6/2018 | Chou | G02B 27/60 |
| 2018/0284409 A1* | 10/2018 | Otani | G02B 27/0927 |
| 2018/0284410 A1* | 10/2018 | Otani | G02B 27/30 |
| 2020/0049981 A1* | 2/2020 | Dong | G02B 3/10 |
| 2021/0011301 A1* | 1/2021 | Chen | H10F 77/484 |
| 2022/0196999 A1* | 6/2022 | Newman | F24S 10/70 |
| 2025/0035287 A1* | 1/2025 | Yoshida | H10H 20/855 |
| 2025/0119212 A1* | 4/2025 | Aitken | H04B 10/27 |
| 2025/0258322 A1* | 8/2025 | Haas | H04B 10/1121 |

FOREIGN PATENT DOCUMENTS

| WO | WO-2010026691 A1 * | 3/2010 | G03B 9/02 |
| WO | 2018220388 | 12/2018 | |
| WO | WO-2019201634 A1 * | 10/2019 | G02B 19/0066 |
| WO | 2020240016 | 12/2020 | |
| WO | 2022214445 | 10/2022 | |
| WO | WO-2023161632 A1 * | 8/2023 | H04B 10/27 |
| WO | 2023218205 | 11/2023 | |
| WO | WO-2023218205 A1 * | 11/2023 | H04B 10/11 |

OTHER PUBLICATIONS

The International Bureau of WIPO, International Preliminary Report On Patentability dated Nov. 28, 2024 in Application No. PCT/GB2023/051249.

ISA, International Search Report and Written Opinion dated Aug. 4, 2023 in PCT/GB2023/051249.

IPO, GB Search Report dated Nov. 10, 2023 in GB Serial No. GB2207040.3.

* cited by examiner

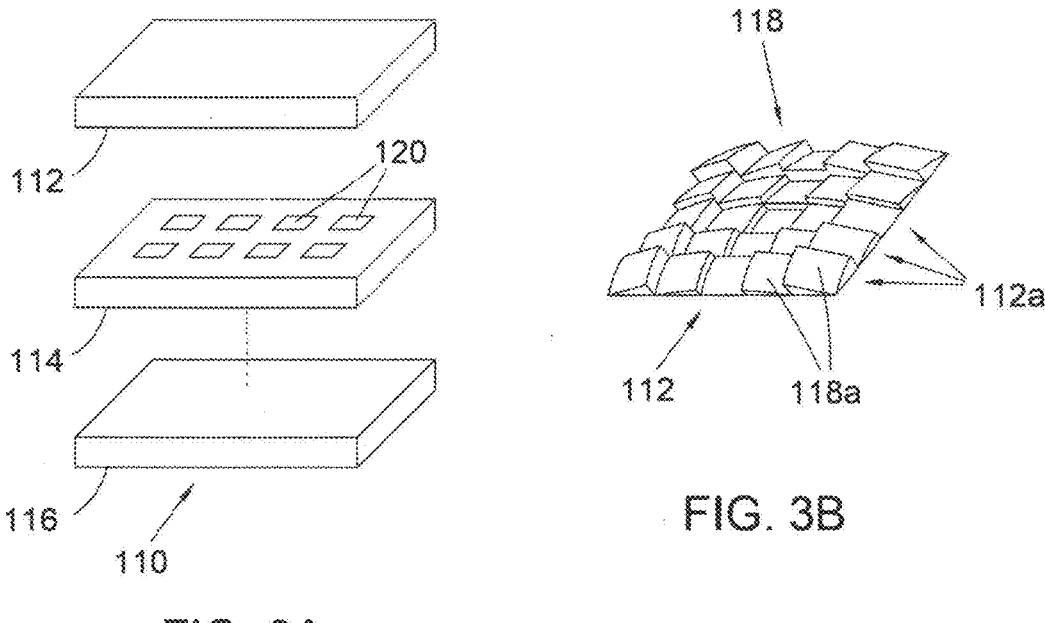
FIG. 3A
FIG. 3B
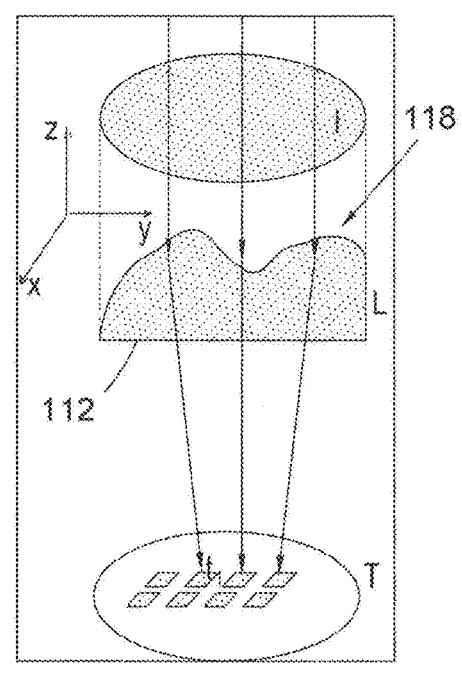
FIG. 3C

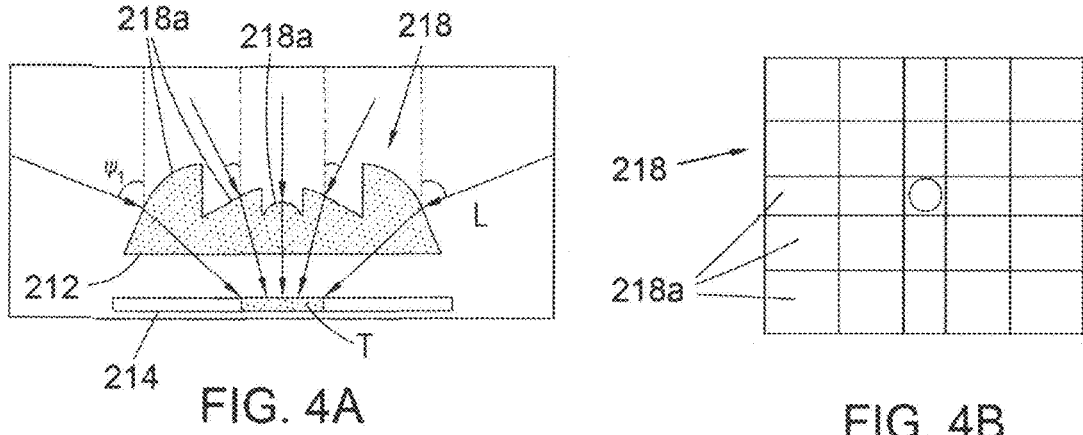
FIG. 4A
FIG. 4B
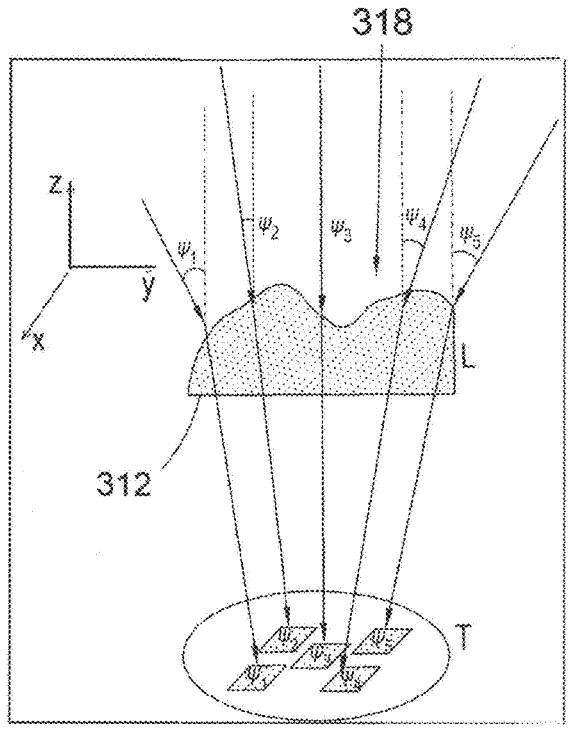
FIG. 5

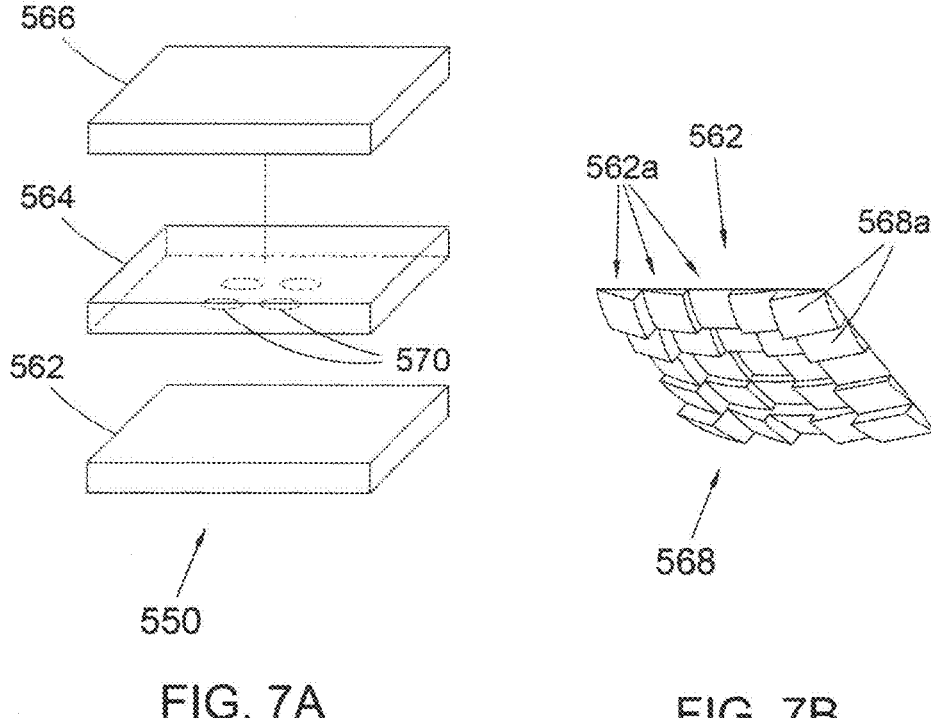
FIG. 7A
FIG. 7B
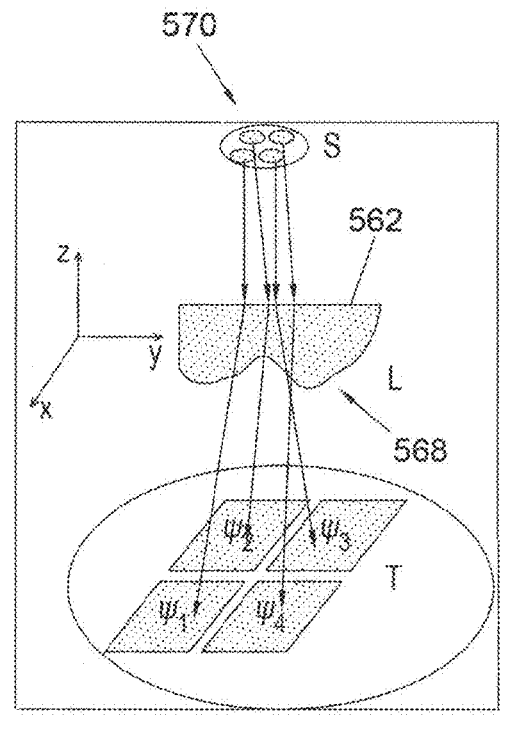
FIG. 7C

FREEFORM OPTICS FOR OPTICAL WIRELESS COMMUNICATIONS

CROSS REFERENCE TO RELATED APPLICATIONS

This application is a U.S. national stage entry under 35 U.S.C. § 371 of International Application No. PCT/GB2023/051249 filed May 12, 2023 entitled "Freeform Optics For Optical Wireless Communications." The '249 PCT claims priority to, and the benefit of, GB Application Serial No. 2207040.3 filed May 13, 2022, entitled "Freeform Optics For Optical Wireless Communications." Each of the foregoing applications are hereby incorporated by reference in their entirety for all purposes.

FIELD

The present disclosure relates to an optical wireless communications (OWC) receiver, an OWC transmitter, and an OWC system.

BACKGROUND

It is known to provide wireless data communications by using light instead of radio frequencies to transmit and receive data wirelessly between devices. Data may be transmitted using light by modulating an intensity of the light. The light used may be coherent or incoherent. Methods that use light to transmit data wirelessly may be referred to as optical wireless communications (OWC), LiFi Networks or light communications (LC).

OWC, or LC, can offer advantages over conventional RF wireless communication such as Wi-Fi™, due to characteristics of the optical channel. Optical signals usually do not penetrate, for example, walls, unlike RF signals, which can provide for increased security. Furthermore, the optical transmissions can be particularly directional in nature.

OWC networks using visible light may in some circumstances allow a higher data capacity and greater energy efficiency than radio frequency wireless networks, and may also be used to replace point-to-point infrastructure in locations where conventional infrastructure does not exist or is too expensive to build.

A typical OWC network may comprise an OWC transmitter in the form of an Access Point (AP) and one or more OWC receivers in the form of one or more Stations (STAs). In one such OWC network, the AP may communicate with each STA via a downlink from the AP to the STA and an uplink from the STA to the AP. Full-duplex communication is achieved by the uplink and downlink wireless communication being performed at different optical wavelengths or different ranges of optical wavelengths. For example, the AP may be incorporated into a luminaire and may use the visible light of the luminaire for the downlink. The STA may be incorporated into a mobile electronic device, for example a smartphone, and may use infrared (IR) light for the uplink. To optimise signal to noise ratio (SNR) at a receiver in either the AP or the STA, an optical filter may be used in conjunction with one or more photodetectors to optically separate light at a desired wavelength from light in the rest of the received spectrum. Light outside of the chosen wavelength or range of wavelengths may contribute to noise if not filtered out.

Each OWC receiver may include a photodetector and an optical component for imaging or concentring light onto a light sensitive region of the photodetector. For example, it is known to use an optical component in the form of a classical imaging optical component like a plano-convex lens, an aspherical lens or a biconvex lens to image light onto the light sensitive region of the photodetector. In order to maintain effective and robust OWC signal transmission especially for high data rate transfer it is desirable to maximise received signal strength for maximum signal-to-noise ratio (SNR) at the OWC receiver. However, such classical imaging optical components may be sensitive to mis-alignment between the OWC transmitter and the OWC receiver. Moreover, classical imaging optical components are usually cylindrically symmetric about a central axis, whereas high frequency response photodetectors or photodetector arrays often have non-circular light sensitive regions. Consequently, the use of such classical imaging optical components may result in incident light being focused on only a portion, for example only a circular central portion, of the light sensitive region of the photodetector thereby reducing the SNR at the OWC receiver.

For the foregoing reasons, it is known to use non-imaging optics such as optical concentrators, such as compound parabolic concentrators (CPCs), in OWC receivers to provide greater robustness against misalignment and an enhanced acceptance angle compared to classical imaging optics. It is also known to use optical concentrators to enhance the SNR at the OWC receiver. However, the thickness or height of known optical concentrators may increase the size or form factor of the OWC receiver, which may prohibit the use of known optical concentrators for some technical applications.

SUMMARY

According to an aspect of the present disclosure there is provided an optical wireless communication (OWC) receiver for receiving light encoded with one or more data signals from one or more light sources of one or more OWC transmitters and for generating one or more electrical signals which are representative of the received light, wherein the OWC receiver comprises:

a photodetector configured to generate the one or more electrical signals comprising one or more light sensitive regions, wherein each light sensitive region is configured to generate a corresponding electrical signal in response to the incidence of light on the light sensitive regions; and a freeform optical component comprising a plurality of lenslets, each lenslet comprising a corresponding lenslet optical surface, wherein at least one of the lenslet optical surfaces is translationally and cylindrically asymmetric, wherein the freeform optical component comprises a three-dimensional freeform optical surface which includes the lenslet optical surfaces, and wherein the freeform optical component and the photodetector are configured so that the freeform optical component directs at least a portion of the light that is incident on the freeform optical component from the light source onto the photodetector.

Such a freeform optical component may be used to concentrate light on a target region with an optical concentration ratio which is comparable to the optical concentration ratio or optical gain achievable for the same target region using a plano-convex lens of the same width and focal length as the freeform optical component, but wherein the freeform optical component has a thickness which may be reduced by a factor of two or more relative to the thickness of the plano-convex lens. This may be important for some applications which require the use of small optoelectronic packages or form factors. In some of these applications a very short focal length is required to keep package size to a minimum while maintaining wide field of view. Classical optics require a thick lens for such high refractive optical power. The freeform optical component may have high refractive power, a short focal length and/or a wide field-of-view (FOV). The freeform optical component may also be lightweight and/or comprise a plastic material.

A lenslet may be considered to be a lens element associated with and/or adjacent to at least one other lens element, wherein the lens elements have a related or shared optical function or purpose. The plurality of lenslets may be positioned in or comprise an ordered arrangement such as an array which may for instance be a linear or curved arrangement.

A lenslet optical surface may be considered to be cylindrically asymmetric if the lenslet optical surface is not cylindrically symmetric i.e. if the lenslet optical surface is not configured so that the lenslet optical surface remains unchanged after rotation of the lenslet optical surface through any angle about an axis of rotation, wherein the axis of rotation may or may not extend through the lenslet optical surface.

Optionally, at least two of the plurality of lenslets have different refractive indices and/or different shapes.

Optionally, the freeform optical surface comprises one or more steps or discontinuities between the lenslet optical surfaces of one or more adjacent pairs of lenslets.

Optionally, the freeform optical surface comprises a change in a sign of a gradient of the freeform optical surface between the lenslet optical surfaces of one or more adjacent pairs of lenslets.

Optionally, the plurality of lenslets comprises a lenslet array.

Optionally, the plurality of lenslets comprises a core lenslet; and a plurality of peripheral lenslets located outside a periphery of the core lenslet.

Optionally, each of one or more of the peripheral lenslets comprises a size and/or shape which is different to a size and/or shape of the core lenslet.

Optionally, each of one or more of the peripheral lenslets has a surface normal axis at a centre point of the peripheral lenslet optical surface arranged at a different angle to a surface normal axis at a centre point of the core lenslet optical surface.

Optionally, light incident on one or more of the peripheral lenslets and directed to a target region of the photodetector has a range of angles of incidence which is adjacent to, or at least partially overlaps with, a range of angles of incidence of light which is incident on the core lenslet and which is directed to the target region of the photodetector.

Optionally, the freeform optical component and the photodetector are configured so that light, which is incident on a first region of incidence on, or coinciding with, the core lenslet over a first range of angles of incidence is directed onto a corresponding first target region on the photodetector, and light which is incident on a second region of incidence on, or coinciding with, a peripheral lenslet over a second range of angles of incidence is directed onto a second target region on the photodetector, wherein the second target region on the photodetector coincides with, or at least partially overlaps with, the first target region on the photodetector Optionally, the second target region is circularly asymmetric, for example wherein the second target region has a polygon shape.

The second target region may be considered to be circularly asymmetric if the second target region is not circularly symmetric i.e. if the second target region is not configured so that the second target region remains unchanged after rotation of the second target region through any angle about an axis of rotation, wherein the axis of rotation may or may not extend through the second target region.

Optionally, the plurality of peripheral lenslets comprise one or more inner peripheral lenslets and one or more outer peripheral lenslets, wherein the one or more inner peripheral lenslets are located closer to the core lenslet than the one or more outer peripheral lenslets.

Optionally, the freeform optical surface is configured such that a FOV of the OWC receiver is less than or equal to 70 degrees.

Optionally, the thickness of the freeform optical component is less than 30 mm, less than 10 mm, or less than 5 mm.

Optionally, the freeform optical component and the photodetector are separated by a distance of less than 10 mm or less than 5 mm.

Optionally, the OWC receiver comprises one or more at least partially transparent members, wherein the one or more at least partially transparent members are located between the freeform optical component and the photodetector so as to separate the freeform optical component and the photodetector.

Optionally, a total thickness of the one or more at least partially transparent members is less than 10 mm or less than 5 mm.

Optionally, a total optical thickness of the one or more at least partially transparent members is less than 10 mm or less than 5 mm, wherein the optical thickness of each at least partially transparent member is defined as the product of the thickness and refractive index of the at least partially transparent member.

Optionally, the freeform optical component and the one or more light sensitive regions of the photodetector are separated by a distance of less than 10 mm or less than 5 mm.

Optionally, the one or more at least partially transparent members are located between the freeform optical component and the one or more light sensitive regions of the photodetector so as to separate the freeform optical component and the one or more light sensitive regions of the photodetector.

Optionally, the freeform optical component comprises at least one of:
   a) a transmissive optical component;
   b) a refractive optical component;
   c) an optical lens component;
   d) an imaging optical component or a non-imaging optical component.

Optionally, the freeform optical component and the photodetector are configured so that the freeform optical component maps or translates or directs light that is incident on each of one or more regions of incidence of the freeform optical surface over a corresponding range of angles of incidence onto one or more target regions on the photodetector, and wherein a shape of a perimeter or a contour of each of the one or more target regions on the photodetector is different to a shape of a perimeter or a contour or a size of each of the one or more regions of incidence of the freeform optical surface.

Optionally, the freeform optical component and the photodetector are configured so that the freeform optical component maps or translates or directs light that is incident on each of one or more regions of incidence of the freeform optical surface over a corresponding range of angles of incidence towards and/or onto one or more target regions on the photodetector.

Optionally, one or more of the target regions at least partially matches one or more of the light sensitive regions in position, shape and/or size, or at least partially overlaps with one or more of the light sensitive regions.

Optionally, each target region matches a corresponding light sensitive region in position, shape and/or size, or at least partially overlaps with a corresponding light sensitive region.

Mapping of light from a region of incidence on the freeform optical surface refers to a prescribed way of assigning the light flux incident on a portion of the freeform optical surface to a target region or a portion of a target region on the photodetector.

Matching of the target region or regions to the light sensitive region or regions is to co-ordinate the target region(s) to the shape and/or size of the light sensitive region(s) such that at least a portion of the target region(s) coincide with the light sensitive region(s). In some examples where all the target regions(s) fall within the light sensitive region(s), the light detection efficiency may be high. In some examples at least part of more than one target region may fall on the same light sensitive region and in other examples a target region may overlap more than one light sensitive region.

Optionally, the freeform optical component and the photodetector are configured so that a strength or magnitude of an electrical signal generated by each of one or more of the light sensitive regions in response to the incidence of light on each of one or more of the light sensitive regions is independent of an angle of incidence of the light on the region of incidence of the freeform optical surface when the angle of incidence is within a limited range of angles of incidence.

Optionally, the freeform optical component and the photodetector are configured so that a strength or magnitude of an electrical signal generated by one or more of the light sensitive regions in response to the incidence of light on the one or more of the light sensitive regions is independent of an angle of incidence of the light on the region of incidence of the freeform optical surface when the angle of incidence is within a limited range of angles of incidence. Optionally, the freeform optical component and the photodetector are configured so that each of one or more of the target regions is larger or smaller than each of one or more of the light sensitive regions.

Optionally, the freeform optical component and the photodetector are configured so that:

the freeform optical component maps or translates or directs desired light that is incident on each of one or more regions of incidence of the freeform optical surface at a desired angle of incidence onto one or more target regions on the photodetector which at least partially overlap one or more of the light sensitive regions, and the freeform optical component maps or translates or directs undesired light that is incident on each of one or more regions of incidence of the freeform optical surface at an undesired angle of incidence onto one or more target region on the photodetector which do not overlap any of the light sensitive regions.

Undesired light or undesired angle of incidence may for example be light and/or angle of incidence which may produce unreliable or inaccurate receiver performance in end use.

Optionally, the one or more light sensitive regions comprise a plurality of light sensitive regions, wherein each light sensitive region is configured to generate a corresponding electrical signal in response to the incidence of light on the light sensitive region.

Optionally, the plurality of light sensitive regions are arranged in an array such as a uniform 1D or 2D array.

Optionally, the OWC receiver is configured to associate the electrical signals generated by different light sensitive regions with light incident on the freeform optical surface at corresponding different angles of incidence.

Optionally, the OWC receiver is configured to determine the angle of incidence of the light incident on the freeform optical surface based on the electrical signals generated by the plurality of the light sensitive regions.

Optionally, the OWC receiver is configured to distinguish between light which is incident on the freeform optical surface from a plurality of different angles of incidence based on the electrical signals generated by the plurality of light sensitive regions.

Optionally, the OWC receiver comprises a decoder for decoding and/or determining, from the one or more generated electrical signals, at least part of the one or more data signals encoded on the light received by the OWC receiver from the one or more light sources of the one or more OWC transmitters.

Optionally, the OWC receiver is configured for receiving light from a plurality of light sources of one or more OWC transmitters, the light from each light source being encoded with a corresponding data signal, wherein the OWC receiver is configured so that the freeform optical component maps or translates or directs light received from at least one light source of the plurality of light sources onto one or more corresponding different light sensitive regions and at least one of the one or more different light sensitive regions generates a corresponding electrical signal, and wherein the decoder is configured to decode a data signal from one or more of the generated electrical signals, each decoded data signal representing at least part of the corresponding data signal transmitted by the corresponding light source to the OWC receiver Optionally, two or more of the data signals encoded on the light emitted by the plurality of light sources are the same or different.

Optionally, the OWC receiver is configured for receiving light from a plurality of light sources of one or more OWC transmitters, the light from each light source being encoded with the same data signal, wherein the OWC receiver is configured so that the freeform optical component maps or translates or directs the light received from different light sources of the plurality of light sources onto one or more light sensitive regions and each light sensitive region generates a corresponding electrical signal, and wherein the decoder is configured to decode a data signal from one or more of the generated electrical signals, or to decode a data signal from a sum or a weighted sum of the electrical signals generated by two or more of the light sensitive regions, the decoded data signal representing at least part of the data signal transmitted by the plurality of light sources to the OWC receiver.

Optionally, a data signal is encoded on the light emitted by a plurality of light sources according to a modulation technique where the encoding of the at least part of the data signal is dependent on an activation pattern of the plurality of light sources, wherein the decoder is configured to distinguish the activation pattern or signals representing the activation pattern of the plurality of light sources from the electrical signals generated by the plurality of light sensitive regions of the photodetector and to decode at least part of the data signal encoded on the activation pattern or the signals representing the activation pattern of the light emitted by the plurality of light sources.

Optionally, the OWC receiver comprises an optical filter, wherein the optical filter has a wavelength response which is dependent on an angle of incidence of light incident on the optical filter, and wherein the OWC receiver is configured so that light which is incident on the OWC receiver from a light source of an OWC transmitter is filtered by the optical filter and mapped or translated or directed onto one or more of the light sensitive regions of the photodetector so that the corresponding one or more electrical signals generated by the one or more light sensitive regions depend at least in part on the angle of incidence of light on the optical filter as a consequence of the dependency of the wavelength response of the optical filter on the angle of incidence of light incident on the optical filter.

Optionally, the OWC receiver is configured for receiving light from a plurality of light sources of one or more OWC transmitters, the light from each light source being encoded with a corresponding data signal or the light from the plurality of light sources being encoded with a data signal, wherein the OWC receiver is configured so that the freeform optical component maps or translates or directs light received from each light source of the plurality of light sources onto one or more different light sensitive regions, and each of the one or more different light sensitive regions generates a corresponding electrical signal, and wherein the decoder is configured to decode, from the one or more generated electrical signals, at least part of the corresponding data signal encoded on the light from each light source or at least part of the data signal encoded on the light from the plurality of light sources, and wherein the OWC receiver is configured to:

characterize each generated electrical signal as a desired electrical signal or an undesired electrical signal based at least part on the one or more decoded data signals; and isolate, reject, remove, or at least partially reduce, suppress or attenuate, one or more of the undesired electrical signals so as to at least partially reduce or suppress interference between at least one of the desired electrical signals and at least one of the undesired electrical signals.

Optionally, the freeform optical component is formed integrally or monolithically with the photodetector.

Optionally, the photodetector forms part of, or is integrated with, an application specific integrated circuit (ASIC).

Optionally, the OWC receiver comprises one or more optical elements which are additional to the freeform optical component.

Optionally, the one or more optical elements comprise an optically transparent or semi-transparent cover or filter or coating of the freeform optical component.

Optionally, the optically transparent or semi-transparent cover or filter comprises a portion of a transparent or partially or semi-transparent display.

Optionally, the freeform optical surface of the freeform optical component may face away from the photodetector.

Optionally, the freeform optical surface of the freeform optical component may face towards the photodetector.

Optionally, the OWC receiver is configured to receive light of different wavelengths, wherein each wavelength is encoded with a corresponding data signal or a corresponding part of a data signal using wavelength division multiplexing (WDM) or wavelength division multiple access (WDMA), and wherein the freeform optical component and the photodetector are configured so that the freeform optical component directs at least a portion of the light at each wavelength that is incident on the freeform optical surface onto a corresponding target region or regions of the photodetector.

Optionally, the OWC receiver is configured to distinguish between the data signals encoded on the different wavelengths or the different parts of the data signal encoded on the different wavelengths.

Optionally, the freeform optical component and the photodetector are configured so that the freeform optical component directs at least a portion, of the light that is incident on the freeform optical component from each of the one or more light sources of the one or more OWC transmitters onto one or more of the light sensitive elements.

Optionally, the freeform optical component and the photodetector are configured so that the freeform optical component directs at least a portion of the light that is incident on the freeform optical component from the one or more light sources of the one or more OWC transmitters onto all of the one or more light sensitive elements.

According to an aspect of the present disclosure there is provided an optical wireless communication (OWC) transmitter for transmitting light encoded with at least part of a data signal, the OWC transmitter comprising:

a light source for emitting light which is encoded with at least part of the data signal; and a freeform optical component comprising a plurality of lenslets, each lenslet comprising a corresponding lenslet optical surface, wherein at least one of the lenslet optical surfaces is translationally and cylindrically asymmetric, wherein the freeform optical component comprises a three-dimensional freeform optical surface which includes the lenslet optical surfaces, and wherein the light source and the freeform optical component are configured so that the freeform optical component directs at least a portion of the light that is incident on the freeform optical component from the light source through a OWC transmission field of view.

Optionally, at least two of the plurality of lenslets have different refractive indices and/or different shapes.

Optionally, the freeform optical surface comprises one or more steps or discontinuities between the lenslet optical surfaces of one or more adjacent pairs of lenslets.

Optionally, the freeform optical surface comprises a change in a sign of a gradient of the freeform optical surface between the lenslet optical surfaces of one or more adjacent pairs of lenslets.

Optionally, the plurality of lenslets comprises a lenslet array.

Optionally, the plurality of lenslets comprises:

a core lenslet; and a plurality of peripheral lenslets located outside a periphery of the core lenslet.

Optionally, each of one or more of the peripheral lenslets comprises a size and/or shape which is different to a size and/or shape of the core lenslet.

Optionally, each of one or more of the peripheral lenslets has a surface normal axis at a centre point of the peripheral lenslet optical surface arranged at a different angle to a surface normal axis at a centre point of the core lenslet optical surface.

Optionally, light which is incident on one or more of the peripheral lenslets and directed to a target region of the photodetector has a range of angles of incidence which is adjacent to, or at least partially overlaps with, a range of angles of incidence of light which is incident on the core lenslet and which is directed to the target region of the photodetector.

Optionally, the plurality of peripheral lenslets comprise one or more inner peripheral lenslets and one or more outer peripheral lenslets, wherein the one or more inner peripheral lenslets are located closer to the core lenslet than the one or more outer peripheral lenslets.

Optionally, the freeform optical surface is configured such that a field of view of the OWC transmitter is less than or equal to 70 degrees.

Optionally, a thickness of the freeform optical component is less than 30 mm, less than 10 mm, or less than 5 mm.

Optionally, the light source and the freeform optical component are separated by a distance of less than 10 mm or less than 5 mm.

Optionally, the OWC transmitter comprises one or more at least partially transparent members, wherein the one or more at least partially transparent members are located between the light source and the freeform optical component so as to separate the light source and the freeform optical component.

Optionally, a total thickness of the one or more at least partially transparent members is less than 10 mm or less than 5 mm.

Optionally, a total optical thickness of the one or more at least partially transparent members is less than 10 mm or less than 5 mm, wherein the optical thickness of each at least partially transparent member is defined as the product of the thickness and refractive index of the at least partially transparent member.

Optionally, the light source and the freeform optical component are configured so that the freeform optical component directs at least a portion of the light that is incident on the freeform optical component from the light source so as to provide a desired intensity distribution in a plane of reception located within the OWC transmission field of view.

Optionally, wherein the desired intensity distribution has a desired shape, perimeter or contour in the plane of reception located within the OWC transmission field of view.

Optionally, the desired intensity distribution in the plane of reception located within the OWC transmission field of view is a desired uniform intensity distribution.

Optionally, the OWC transmitter comprises:

a plurality of light sources, the plurality of light sources including the light source; and at least one freeform optical component, the at least one freeform optical component including the freeform optical component, wherein each light source is configured to emit light encoded with at least part of a data signal and/or with a corresponding data signal, wherein each freeform optical component comprises a corresponding plurality of lenslets, each lenslet comprising a corresponding lenslet optical surface, wherein at least one of the lenslet optical surfaces of each freeform optical component is translationally and cylindrically asymmetric, wherein each freeform optical component comprises a corresponding three-dimensional freeform optical surface which includes the corresponding lenslet optical surfaces.

Optionally, the plurality of light sources and the at least one freeform optical component are configured so that the at least one freeform optical component directs at least a portion of the light that is incident on the at least one freeform optical component from one or more of the light sources so as to provide a corresponding desired intensity distribution in a plane of reception located within the OWC transmission field of view.

Optionally, the plurality of light sources and the at least one freeform optical component are configured so that the at least one freeform optical component directs at least a portion of the light that is incident on the at least one freeform optical component from one or more of the light sources so as to provide a corresponding desired intensity distribution in a plane of reception located within a plurality of OWC transmission fields of view, the plurality of OWC transmission fields of view including the OWC transmission field of view.

Optionally, the desired intensity distribution corresponding to at least one light source comprises a desired intensity distribution in the plane of reception.

Optionally, the desired intensity distribution corresponding to at least one light source comprises a uniform intensity distribution in the plane of reception.

Optionally, the desired intensity distribution corresponding to each light source has a desired shape, perimeter or contour in the plane of reception, for example, a round, square, rectangular, quadrilateral, hexagonal, or any other symmetric or asymmetric shape, perimeter or contour.

Optionally, at least two of the light sources are configured to emit light of a different wavelength or to emit light having a different range of wavelengths.

Optionally, each wavelength is encoded with a corresponding data signal or a corresponding part of a data signal using wavelength division multiplexing (WDM) or wavelength division multiple access (WDMA).

Optionally, the freeform optical component and the plurality of light sources are configured so that the freeform optical component directs at least a portion of the light at each wavelength that is incident on the freeform optical surface onto a corresponding OWC transmission field of view. Optionally, the freeform optical surface of the freeform optical component may face away from the light source.

Optionally, the freeform optical surface of the freeform optical component may face towards the light source.

According to an aspect of the present disclosure there is provided an optical wireless communication (OWC) system comprising one or more OWC transmitters, and one or more OWC receivers as described above.

According to an aspect of the present disclosure there is provided an optical wireless communication (OWC) system comprising one or more OWC transmitters as described above and one or more OWC receivers.

According to an aspect of the present disclosure there is provided an optical wireless communication (OWC) system comprising one or more OWC transmitters as described above, and one or more OWC receivers as described above.

Optionally, the OWC system comprises a plurality of OWC transmitters, wherein each OWC transmitter comprises an OWC transmitter as described above, wherein each OWC transmitter produces a corresponding desired intensity distribution in a plane of reception located within a corresponding OWC transmission field of view, and wherein the plurality of OWC transmission fields of view together form a combined field of view.

Optionally, there is no or minimum light signal overlap between at least two of the OWC transmission fields of view.

Optionally, the OWC transmission fields of view form a tessellation pattern covering the combined field of view.

Optionally, the intensity distribution in the plane of reception produced by at least one OWC transmitter comprises a uniform intensity distribution.

According to an aspect of the present disclosure there is provided an electronic device comprising a transparent or semi-transparent display, and an OWC receiver as described above and/or an OWC transmitter as described above.

Optionally, at least part of the OWC receiver is located behind the display.

Optionally, the electronic device is configured so that the photodetector of the OWC receiver receives light after the light is transmitted through the display.

Optionally, the freeform optical component of the OWC receiver forms part of the display, is formed integrally with the display, or is monolithically integrated with the display.

Optionally, at least part of the OWC transmitter is located behind the display.

Optionally, the electronic device is configured so that light from the light source of the OWC transmitter is transmitted through the display.

Optionally, the freeform optical component of the OWC transmitter forms part of the display, is formed integrally with the display, or is monolithically integrated with the display.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

An optical wireless communication (OWC) receiver, an OWC transmitter and an OWC system will now be described by way of non-limiting example only with reference to the drawings of which:

FIG. 3A is a schematic of an alternative OWC receiver for use in the OWC system of FIG. 1;

FIG. 3B is a schematic of an alternative freeform optical component of the alternative OWC receiver of FIG. 3A;

FIG. 3C is a schematic illustrating the operation of the alternative freeform optical component of FIG. 3B;

FIG. 4A is a schematic of a freeform optical component having a wide FOV and a corresponding photodetector for use in an OWC receiver such as the OWC receiver of FIG. 2A.

FIG. 4B is a schematic plan view of the freeform optical component shown in FIG. 4A;

FIG. 5 is a schematic illustrating the operation of an angle-selective freeform optical component;

FIG. 7A is a schematic of an OWC transmitter for use in the OWC system of FIG. 1;

FIG. 7B is a schematic of a freeform optical component of the OWC transmitter of FIG. 7A;

FIG. 7C is a schematic illustrating the operation of the freeform optical component of FIG. 7B;

DETAILED DESCRIPTION OF THE DRAWINGS

Figure 1:
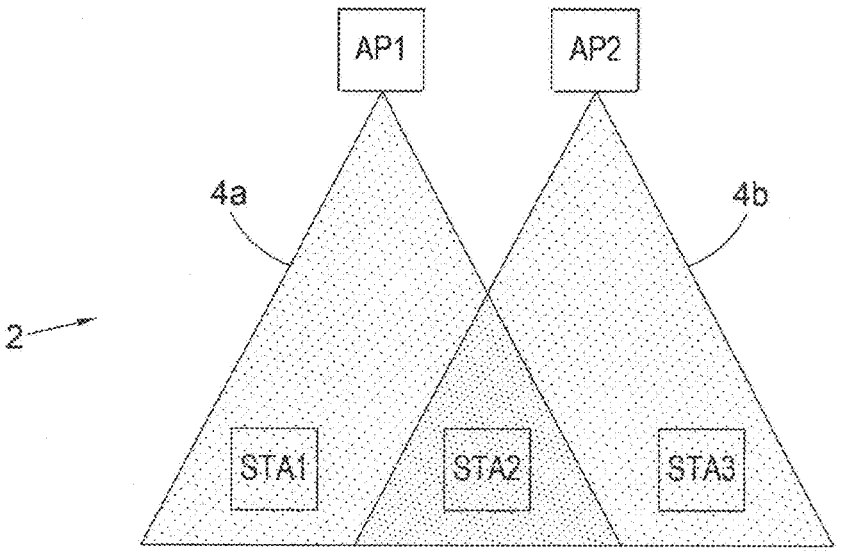
FIG. 1 is a schematic of an optical wireless communication (OWC) system.

Referring initially to FIG. 1 there is shown an optical wireless communication (OWC) system generally designated 2 comprising first and second OWC transmitters in the form of first and second Access Points AP1 and AP2 and first, second and third OWC receivers in the form of first, second and third stations STA1, STA2, and STA3. The first and second OWC transmitters AP1 and AP2 transmit light encoded with corresponding data signals through corresponding OWC transmission field of view (FOV) 4a and 4b respectively. Each of the OWC receivers STA1, STA2, and STA3 may be located in one or both of the transmission fields of view 4a and 4b.

Figure 2A:
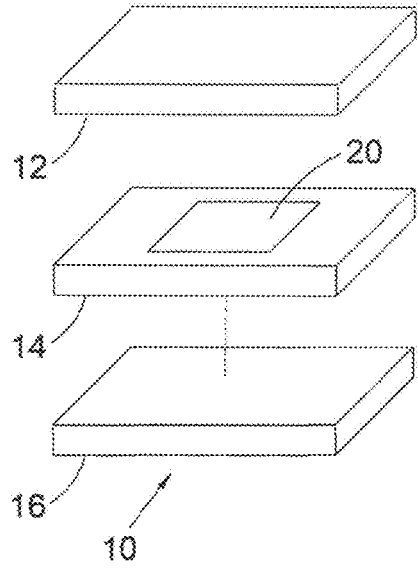
FIG. 2A is a schematic of an OWC receiver for use in the OWC system of FIG. 1.

Referring to FIG. 2A there is shown an OWC receiver generally designated 10 for use as any one or more of the OWC receivers STA1, STA2, and STA3. The OWC receiver 10 comprises a freeform optical component 12, a photodetector 14, and a decoder 16. The photodetector 14 comprises a light sensitive region 20 which is configured to generate an electrical signal in response to the incidence of light on the light sensitive region 20. As indicated by the dashed line between the photodetector 14 and the decoder 16, the photodetector 14 and the decoder 16 are configured for communication. Moreover, the decoder 16 is configured to process the generated electrical signal electronically. The decoder 16 is configured to decode the generated electrical signal so as to recover a corresponding data signal which is encoded on the light incident on the light sensitive region 20 of the photodetector 14.

Figure 2B:
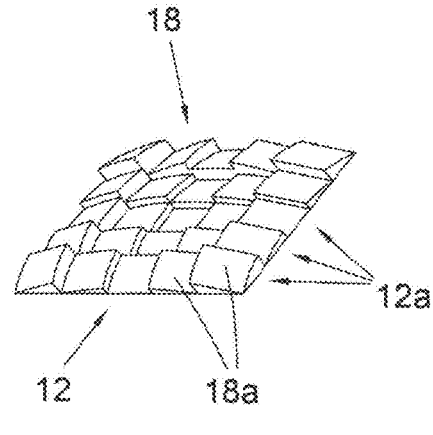
FIG. 2B is a schematic of a freeform optical component of the OWC receiver of FIG. 2A.

As shown in FIG. 2B, the freeform optical component 12 comprises a plurality of lenslets 12a arranged in a lenslet array, each lenslet 12a comprising a corresponding lenslet optical surface 18a, wherein at least one of the lenslet optical surfaces is translationally and cylindrically asymmetric and wherein the freeform optical component comprises a three-dimensional freeform optical surface which includes the lenslet optical surfaces. More specifically, the freeform optical surface 18 comprises one or more steps or discontinuities between the lenslet optical surfaces 18a of one or more adjacent pairs of lenslets 12a and/or wherein the freeform optical surface 18 comprises a change in a sign of a gradient of the freeform optical surface 18 between the lenslet optical surfaces 18a of one or more adjacent pairs of lenslets 12a. The height or thickness of the freeform optical component 12 is typically less than 10 mm and preferably less than 5 mm.

Figure 2C:
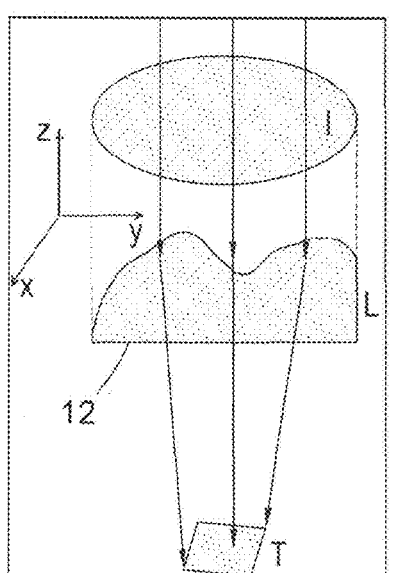
FIG. 2C is a schematic illustrating the operation of the freeform optical component of FIG. 2B.

In use, the freeform optical component 12 and the photodetector 14 are configured so that the freeform optical component 12 directs at least a portion of the light that is incident on the freeform optical component 12 from a light source, such as a light source of the first or second OWC transmitter AP1, AP2, onto the photodetector 14. For example, with reference to FIG. 2C, collimated beams with a uniform irradiance distribution at an aperture plane I are concentrated by the freeform optical component 12 denoted L onto a target region in a target plane T on the photodetector 14. The freeform optical surface 18 is configured so that the incident light may be efficiently mapped, directed, translated or transformed from a region of incidence of the light on the freeform optical surface 18 of a specific shape and size to the target region of a specific shape and size in the target plane T which is selected to at least partially match the light sensitive region 20 of the photodetector 14 in position, shape and/or size, to coincide with the light sensitive region 20 of the photodetector 14, or to at least partially overlap with the light sensitive region 20 of the photodetector 14. The target region in the target plane T may have a desired shape which is different to the shape of the region of incidence. For example, as shown in FIG. 2C, the freeform optical surface 18 may be configured so that the freeform optical component 12 maps or translates or directs the total irradiance incident on a circular aperture in the aperture plane I onto a quadrilateral target region in the target plane T on the photodetector 14 which may be selected to match, for example to coincide with in position, shape and/or size, or to at least partially overlap with a corresponding light sensitive region, or to completely fit within, the quadrilateral light sensitive region 20. Moreover, the transformation of the light incident on the freeform optical surface 18 to the photodetector 14 may be accomplished with a very low profile freeform optical component 12 having a height or thickness that may in some circumstances be an order of magnitude less than, or a fraction of, the height or thickness of a traditional optical concentrator.

Referring to FIG. 3A there is shown an alternative OWC receiver generally designated 110 for use as any one or more of the OWC receivers STA1, STA2, and STA3. The OWC receiver 110 comprises a freeform optical component 112, a photodetector 114, and a decoder 116. The photodetector 114 comprises a plurality of light sensitive regions 120 arranged in a regular 2D array, wherein each light sensitive region 120 is configured to generate a corresponding electrical signal in response to the incidence of light on the light sensitive region 120. As indicated by the dashed line between the photodetector 114 and the decoder 116, the photodetector 114 and the decoder 116 are configured for communication. Moreover, the decoder 116 is configured to process each of the generated electrical signals electronically. The decoder 116 is configured to decode each generated electrical signal so as to recover a corresponding data signal which is encoded on the light incident on the corresponding light sensitive region 120 of the photodetector 114.

As shown in FIG. 3B, the freeform optical component 112 comprises a plurality of lenslets 112a arranged in a lenslet array, each lenslet 112a comprising a corresponding lenslet optical surface 118a, wherein at least one of the lenslet optical surfaces is translationally and cylindrically asymmetric and wherein the freeform optical component 112 comprises a three-dimensional freeform optical surface 118 which includes the lenslet optical surfaces 118a. More specifically, the freeform optical surface 118 comprises one or more steps or discontinuities between the lenslet optical surfaces 118a of one or more adjacent pairs of lenslets 112a and/or wherein the freeform optical surface 118 comprises a change in a sign of a gradient of the freeform optical surface 118 between the lenslet optical surfaces 118a of one or more adjacent pairs of lenslets 112a. The height or thickness of the freeform optical component 112 is typically less than 10 mm and preferably less than 5 mm.

In use, the freeform optical component 112 and the photodetector 114 are configured so that the freeform optical component 112 directs at least a portion of the light that is incident on the freeform optical component 112 from a light source, such as a light source of the first or second OWC transmitter AP1, AP2, onto the photodetector 114. For example, with reference to FIG. 3C, collimated beams with a uniform irradiance distribution at an aperture plane I are concentrated by the freeform optical component 112 denoted L onto a plurality of target regions in a target plane T on the photodetector 114. The freeform optical surface 118 is configured so that the incident light may be efficiently mapped, directed or transformed from a region of incidence of the light on the freeform optical surface 118 of a specific shape and size to the plurality of target regions in the target plane T. For example, one or more of the target regions is selected to at least partially match one or more of the light sensitive regions 120 of the photodetector 114 in position, shape and/or size, or to at least partially overlap with one or more of the light sensitive regions 120 of the photodetector 114, or to completely fit within one or more of the light sensitive regions 120 of the photodetector 114. This may provide an improved optical concentration gain relative to the optical concentration gain of classical optical components or known optical concentrators such as compound parabolic concentrators (CPCs) due to the physical design constraints of the classical optical components which may be improved on by the use of the freeform optical surface 118 of the freeform optical component 112. Each of the target regions in the target plane T may have a desired shape which is different to the shape of the region of incidence. For example, as shown in FIG. 3C, the freeform optical surface 118 may be configured so that the freeform optical component 112 maps or directs the total irradiance incident on a circular aperture in the aperture plane I onto a plurality of quadrilateral target regions in the target plane T on the photodetector 114. Moreover, the transformation of the light incident on the freeform optical surface 118 to the photodetector 114 may be accomplished with a very low profile freeform optical component 112 typically having a height or thickness which is a fraction of that of a traditional optical concentrator.

Referring to FIGS. 4A and 4B, there is shown a cross-section of a freeform optical component 212 and a corresponding photodetector 214 for use in an OWC receiver like the OWC receiver 10 of FIG. 2A or the OWC receiver 110 of FIG. 3A illustrating the wide field-of-view (FOV) of the freeform optical component 212. Light beams with various angles of incidence $\psi_i$ are redirected by different regions of the of the freeform optical component 212 denoted L onto one or more target regions in the target plane T of the corresponding photodetector 214. One or more of the target regions is selected to match one or more light sensitive regions of the photodetector 214 in position, shape and/or size, or to at least partially overlap with one or more light sensitive regions of the photodetector 214, or to completely fit within one or more light sensitive regions of the photo-detector 214. Each lenslet optical surface 218a, can map or direct light from a different range of angles of incidence onto the one or more target regions in the target plane T so that the FOV of the freeform optical component 212 may be similar to or greater than the FOV of classical optical components or known optical concentrators such as compound parabolic concentrators (CPCs). Having a wider FOV may be highly desirable for OWC between one or more OWC transmitters AP1, AP2 and one or more OWC receivers STA1, STA2, and STA3. In effect, use of the freeform optical component 212 in one or more OWC receivers STA1, STA2, and STA3 may provide an enhanced optical concentration gain and/or an enhanced FOV using an optical component of reduced physical height or thickness relative to the height or thickness of classical optical components or known optical concentrators such as compound parabolic concentrators (CPCs).

Moreover, in OWC applications where high optical concentration gain is required to improve signal-to-noise ratios such as, for example in high data rate OWC applications, the design of an optical component may be such that light at normal incidence—i.e. light incident normally to a plane of the optical component—is focused directly on the one or more light sensitive regions of a photodetector to maximise the size of the one of more electrical signals generated by the one or more light sensitive regions of the photodetector. Although such optical components may enhance the one or more electrical signals generated at normal incidence, the one or more generated electrical signals may reduce rapidly for small deviations or misalignments from normal incidence as the overlap between the one or more target regions and the one or more light sensitive regions reduces. Use of a freeform optical component like the freeform optical component 12, 112, 212 may, however, reduce the sensitivity of the one or more generated electrical signals to deviations or misalignments of the incoming light, while still creating sufficient light intensity on the one or more target regions in the target plane T and therefore resulting in one or more generated electrical signals of sufficient magnitude. For example, the freeform optical component 12, 112, 212 may form a uniform intensity distribution over each of the one or more target regions in the target plane T such that an initial deviation or misalignment due to a change in the angle of incidence generates an electrical signal which is less sensitive to the angle of incidence than that with a classical optical component or a known optical concentrator such as a compound parabolic concentrator (CPCs). For example, the freeform optical component 12, 112, 212 and the photodetector 14, 114, 214 may be configured so that each of one or more of the target regions in the target plane T is larger or smaller than each of one or more of the light sensitive regions of the photodetector. Alternatively, the freeform optical component 12, 112, 212 and the photodetector 14, 114, 214 may be configured such that, for an initial deviation in the angle of incidence, the peripheral or further peripheral lenslets are configured to map or translate or direct light to a target region falling on a position on the light sensitive region(s) of the photodetector 14, 114, 214 such that optical gain of the received light is less sensitive to deviations of angles of incidence in comparison with a classical optical lens.

A uniform intensity distribution or irradiance distribution may, for example, be an intensity or irradiance distribution where the measured intensity or irradiance values fall within an 80% confidence interval of the mean of the measured results. The intensity or irradiance may be measured by moving a photodetector or irradiance sensor or meter across the plane of reception and recording intensity or irradiance values at different positions. The photodetector or irradiance sensor/meter should preferably have a light sensitive reception area of less than 5% of the area of intensity or irradiance being measured.

Referring to FIG. 5, there is shown an angle-selective freeform optical component 312 which is configured to map or direct light beams incident on a three-dimensional freeform optical surface 318 of the freeform optical component 312 at different angles of incidence $\psi_i$ to different target regions in a target plane T. Although not shown explicitly in FIG. 5, like the freeform optical components 12, 112, 212, the freeform optical component 312 comprises a plurality of lenslets arranged in a lenslet array, each lenslet comprising a corresponding lenslet optical surface, wherein at least one of the lenslet optical surfaces is translationally and cylindrically asymmetric and wherein the freeform optical component 312 comprises a three-dimensional freeform optical surface 318 which includes the lenslet optical surfaces. More specifically, the freeform optical surface 318 comprises one or more steps or discontinuities between the lenslet optical surfaces of one or more adjacent pairs of lenslets and/or wherein the freeform optical surface 318 comprises a change in a sign of a gradient of the freeform optical surface 318 between the lenslet optical surfaces of one or more adjacent pairs of lenslets. The height or thickness of the freeform optical component 312 may typically be less than 10 mm and preferably less than 5 mm.

In some applications of OWC there may be multiple optical transmissions occurring simultaneously for example from the different access points AP1, AP2 in a room to a single OWC receiver device. It is desirable to have a single OWC receiver which has the capability of receiving and decoding a plurality of simultaneously transmitted signals from different light sources or emitters of the different access points AP1, AP2.

With a classical optical component or a known optical concentrator such as a compound parabolic concentrator (CPC), it may be difficult to distinguish and decode incident light from multiple light sources arriving at the photodetector. Use of an angle-selective freeform optical component 312, may allow the spatially separated light beams from the different light sources to be distinguished based on the angle of incidence on the freeform optical component 312. For example, the angle-selective freeform optical component 312 may form part of an OWC receiver which includes a photodetector, and a decoder. The photodetector may comprise a plurality of light sensitive regions, wherein each light sensitive region is configured to generate a corresponding electrical signal in response to the incidence of light on the light sensitive region. The photodetector and the decoder may be configured for communication. Moreover, the decoder may be configured to process each of the generated electrical signals electronically. The decoder may be configured to decode and/or process each generated electrical signal so as to recover a corresponding data signal which is encoded on the light incident on the corresponding light sensitive region of the photodetector. The different target regions in the target plane T may at least partially overlap with different light sensitive regions of the photodetector so that the different electrical signals generated by the different light sensitive elements of the photodetector are therefore at least partly segregated based on angle of incidence. Segregation of the incident light source beams in this way may allow the decoding of data signals from the separate light sources to be more easily achieved. For example, the decoder may be configured to characterize each generated electrical signal as a desired electrical signal or as an undesired electrical signal. For example, the decoder may be configured to characterize each generated electrical signal as a desired electrical signal which is generated as a result of the incidence of light on a corresponding light sensitive region or regions from a desired light source and/or as determined by recognition or measurement or distinguishing or identification of a desired signal characteristic and the decoder may be configured to characterize each generated electrical signal as an undesired electrical signal generated as a result of the incidence of light on the corresponding light sensitive region from an undesired light source and/or as determined by recognition or measurement or distinguishing or identification of an undesired signal characteristic. Moreover, the decoder may be configured to isolate, reject, remove, or at least partially reduce, suppress or attenuate, one or more of the undesired electrical signals so as to at least partially reduce or suppress interference between the desired electrical signals and undesired electrical signals. This may improve the SNR. This may be particularly advantageous when the different light sources and the OWC receiver are part of a multiple-input multiple-output (MIMO) OWC system and distinguishing or signal identification is required for simultaneous reception of at least part of more than one desired signal.

In certain applications, the OWC receiver may comprise at least one optical filter in addition to the angle-selective freeform optical component 312, wherein the optical filter has a wavelength response which is dependent on an angle of incidence of light incident on the optical filter, and wherein the OWC receiver is configured so that light which is incident on the OWC receiver from a light source of an OWC transmitter is filtered by the optical filter and mapped or translated or directed onto one or more of the light sensitive regions of the photodetector so that the corresponding one or more electrical signals generated by the one or more light sensitive regions depend at least in part on the angle of incidence of light on the optical filter as a consequence of the dependency of the wavelength response of the optical filter on the angle of incidence of light incident on the optical filter. The OWC receiver may determine the angle of incidence of light incident on the OWC receiver or a change in angle of incidence of light incident on the OWC receiver based on the position of the photodetector light sensitive region(s) receiving the light and/or on the electrical signal(s) generated by the light sensitive region(s). Use of such an optical filter may increase the dependency of the generated electrical signals on the angle of incidence. This may enable or improve segregation of light incident on the OWC receiver from different angles of incidence to allow or assist in distinguishing or identifying light incident on the OWC receiver from different light sources.

In some cases, the different light sensitive regions may be spaced apart such that if an undesired incident beam of light has an undesired angle of incidence, then the undesired beam of light may be mapped or directed to a corresponding target region in the target plane T which only partially overlaps or does not overlap one of the light sensitive regions of the photodetector and the effect of the undesired beam of light is at least partially reduced.

In some embodiments the strength of the electrical signal generated by any one of the light sensitive regions of the photodetector may be considered to be independent of an angle of incidence of light on a region of incidence of the freeform optical surface when the angle of incidence is within a limited range of angles of incidence such that the magnitude of the electrical signal is measured to have a value within a confidence interval of 80% of the mean value or be measured to have a value within +−10% of the mean value when the angle of incidence is varied throughout the limited range of angles of incidence.

In some embodiments the limited range of angles of incidence may be less than +−15 degrees.

In some embodiments the limited range of angles of incidence may be less than +−30 degrees.

For example, if the limited range of angles of incidence incident on the freeform optical surface were to be +−30 degrees about the optical axis of the freeform optical component, the limited range of angles of incidence over which the strength of the electrical signal generated by a light sensitive region may be considered to be independent of the angle of incidence may be determined using a test light source which produces a uniform light intensity over an angular field of view greater than the limited range of angles of incidence (for example greater than +−30). In this example, an exit aperture of the test light source is initially positioned a suitable distance from the freeform optical surface with an optical axis of the test light source aligned coaxially with the optical axis of the freeform optical component and the electrical signal of the light sensitive region is measured.

The test light source is then moved along a direction normal to the optical axis of the freeform optical component with the optical axis of the test light source remaining parallel to the optical axis of the freeform optical component until a straight line connecting an optical axis point of the test light source and an optical axis point of the freeform optical surface defines an angle of 30 degrees relative to the optical axis of the freeform optical component, where the optical axis point of the test light source is defined as the point of intersection between an optical axis of the test light source and an exit aperture of the test light source and the optical axis point of the freeform optical surface is defined as the point of intersection between the optical axis of the freeform optical component and the freeform optical surface. The electrical signal of the light sensitive region is then again measured.

The test light source is subsequently moved to the opposite 30 degree position relative to the optical axis of the freeform optical component and the electrical signal of the same light sensitive region is measured. The above tests may be repeated within the +− range to obtain sufficient test data to calculate the mean and 80% confidence interval. The strength of the electrical signal measured may be considered as being independent within the +−30 degrees range of angles of incidence when results of tests taken within +−30 degrees to the optical axis of the freeform optical component produce an electrical signal within +−10% of the mean value or within an 80% confidence interval of the mean value when using a photodetector capable of producing suitably sensitive and repeatable electrical signals.

Figure 6:
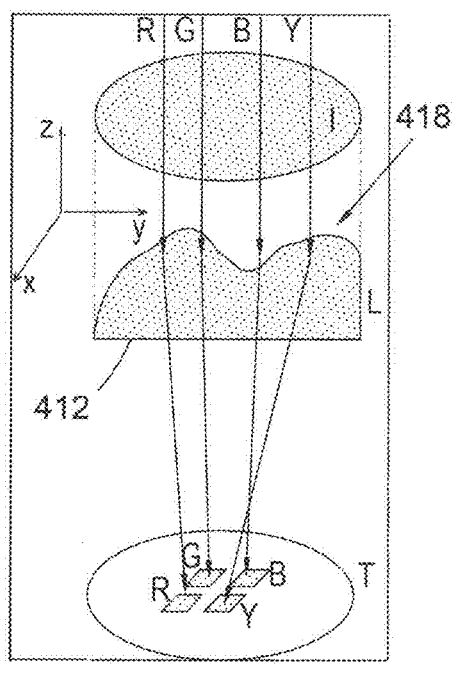
FIG. 6 is a schematic illustrating the operation of a wavelength-selective freeform optical component for use in a WDM OWC receiver.

Referring to FIG. 6, there is shown a wavelength-selective freeform optical component 412 having a freeform optical surface 418 which is configured to map or direct incident beams of light at a circular input aperture I of different wavelengths (for example showing but not limited to RGBY for red, green, blue, yellow) to different quadrilateral or polygon target regions in a target plane T. Although not shown explicitly in FIG. 6, like the freeform optical components 12, 112, 212, 312 the freeform optical component 412 comprises a plurality of lenslets, each lenslet comprising a corresponding lenslet optical surface, wherein at least one of the lenslet optical surfaces is translationally and cylindrically asymmetric, and wherein the freeform optical component 412 comprises a three-dimensional freeform optical surface 418 which includes the lenslet optical surfaces. More specifically, the freeform optical surface 418 comprises one or more steps or discontinuities between the lenslet optical surfaces of one or more adjacent pairs of lenslets and/or wherein the freeform optical surface 418 comprises a change in a sign of a gradient of the freeform optical surface 418 between the lenslet optical surfaces of one or more adjacent pairs of lenslets. The height or thickness of the freeform optical component 412 may typically be less than 10 mm and preferably less than 5 mm.

In some applications of OWC, the communication protocol may adopt wavelength division multiplexing (WDM) where different wavelengths of light are used for simultaneous transmission of data, for example for increasing the rate of data transfer or for improving optical channel segregation or security. With a classical optical component or a known optical concentrator such as a compound parabolic concentrator (CPC), it may be necessary to adopt complex arrangements of spectral filters to decode the incident light from multiple wavelength light sources arriving at the photodetector.

Use of a wavelength-selective freeform optical component 412 may allow incident light beams of different wavelengths or colours and different wavelength channels to be distinguished based on wavelength. For example, the wavelength-selective freeform optical component 412 may form part of an OWC receiver which includes a photodetector, and a decoder. The photodetector may comprise a plurality of light sensitive regions, wherein each light sensitive region is configured to generate a corresponding electrical signal in response to the incidence of light on the light sensitive region. The photodetector and the decoder may be configured for communication. Moreover, the decoder may be configured to process each of the generated electrical signals electronically. The decoder is configured to decode and/or process each generated electrical signal so as to recover a corresponding data signal which is encoded on the light incident on the corresponding light sensitive region or regions of the photodetector. The different target regions in the target plane T may at least partially overlap with different light sensitive regions of the photodetector so that the different electrical signals generated by the different light sensitive regions of the photodetector are therefore segregated based on wavelength or wavelength range. By segregating the different wavelength incident light source beams or channels based on wavelength or wavelength range in this way, the decoding of data signals transmitted on the light from different light sources may be more easily achieved without the need for special arrangements of optical filters.

In certain applications, the OWC receiver may comprise at least one optical filter in addition to the wavelength-selective freeform optical component 412, wherein the optical filter has a wavelength response which is dependent on an angle of incidence of light incident on the optical filter, and wherein the OWC receiver is configured so that light which is incident on the OWC receiver from a light source of an OWC transmitter is filtered by the optical filter and mapped or translated or directed onto one or more of the light sensitive regions of the photodetector so that the corresponding one or more electrical signals generated by the one or more light sensitive regions depend at least in part on the angle of incidence of light on the optical filter as a consequence of the dependency of the wavelength response of the optical filter on the angle of incidence of light incident on the optical filter. The OWC receiver may determine the angle of incidence of light incident on the OWC receiver or a change in angle of incidence of light incident on the OWC receiver based on the position of the photodetector light sensitive region(s) receiving the light and/or on the electrical signal(s) generated by the light sensitive region(s). Use of such an optical filter may increase the dependency of the generated electrical signals on the angle of incidence. This may enable or improve segregation of light incident on the OWC receiver from different angles of incidence to allow or assist in distinguishing or identifying light incident on the OWC receiver from different light sources.

Referring to FIG. 7A there is shown an OWC transmitter generally designated 550 for use as any one or more of the OWC transmitters AP1, AP2 of the OWC system 2 of FIG. 1. The OWC transmitter 550 comprises a freeform optical component 562, an optical emitter 564, and an encoder 566. The optical emitter 564 comprises a plurality of light sources 570. Each light source 570 emits a beam of light which is encoded with a corresponding data signal. As indicated by the dashed line between the optical emitter 564 and the encoder 566, the optical emitter 564 and the encoder 566 are configured for communication. Moreover, the encoder 566 is configured to modulate each light source 570 with a corresponding electrical signal. The encoder 566 is configured to encode a plurality of data signals on a plurality of electrical signals and to use each electrical signal to modulate the light output by a corresponding light source 570.

As shown in FIG. 7B, the freeform optical component 562 comprises a plurality of lenslets 562a arranged in a lenslet array, each lenslet 562a comprising a corresponding lenslet optical surface 568a, wherein at least one of the lenslet optical surfaces 568a is translationally and cylindrically asymmetric, and wherein the freeform optical component 562 comprises a three-dimensional freeform optical surface 568 which includes the lenslet optical surfaces 568a. More specifically, the freeform optical surface 568 comprises one or more steps or discontinuities between the lenslet optical surfaces 568a of one or more adjacent pairs of lenslets 562a and/or wherein the freeform optical surface 568 comprises a change in a sign of a gradient of the freeform optical surface 568 between the lenslet optical surfaces 568a of one or more adjacent pairs of lenslets 562a. The height or thickness of the freeform optical component 562 is typically less than 10 mm and preferably less than 5 mm.

As shown in FIG. 7C, the freeform optical component 562 is configured so that, in use, the freeform optical component 562 maps, translates or directs light from four light sources each emitting light from a circular emission region, or an arbitrary intensity profile, at a source plane S at different positions/orientations into a plurality of uniform quadrilateral target regions at a target plane T. It should be understood that the freeform optical component 562 is configured so that, in use, the freeform optical component 562 maps, translates or directs light from individual light sources to one or more specific target regions according to the shape of the one or more target regions and the desired intensity distribution across the one or more target regions.

In some applications of OWC, the light sources or emitters may have a non-uniform intensity distribution or characteristic optical output, for example a Lambertian and Gaussian distribution, across a transmission field of view (FOV). This can create problems with non-linear signal reception depending on the location of the OWC receiver within the transmission FOV and may be compensated to some extent by use of additional OWC transmitters. The freeform optical component 562 may be tuned to the specific characteristics of the light source output distribution so as to map, direct, translate or transform light into:

a) a transmission pattern from at least one light source of desired intensity distribution across the transmission FOV in the plane of reception; and/or b) a transmission pattern from at least one light source of specific desired shape, for example round or polygon; and/or c) a transmission pattern from at least one light source of uniform intensity distribution.

Use of such a freeform optical component 562 may mean that a group of OWC transmitter light sources provide uniform intensity coverage in a reception plane over a certain region, such as for example an installation with multiple access points AP1, AP2, may comprise a reduced number or access points compared with the use of a classical optical component or a known optical concentrator such as a compound parabolic concentrator (CPC) because the overlap between the transmission fields of view and the uniform light intensity distribution is better defined when using the freeform optical component 562 thereby allowing, or resulting in, the use of smaller overlap regions. In the reception plane, the transmission FOV may for example be of square shape providing a tile or tessellation pattern with minimal overlap regions between adjacent transmission fields of view.

Where the OWC transmitter comprises different light sources, such as for example in the case of an illumination light source and a separate OWC light source, it is possible to use at least one freeform optical component 562 within the same device, such as an access point device AP1, AP2, to provide a desired light intensity distribution, for example a desired light intensity distribution having a desired shape, for both different types of light source, or for each different type of light source.

Figure 8:
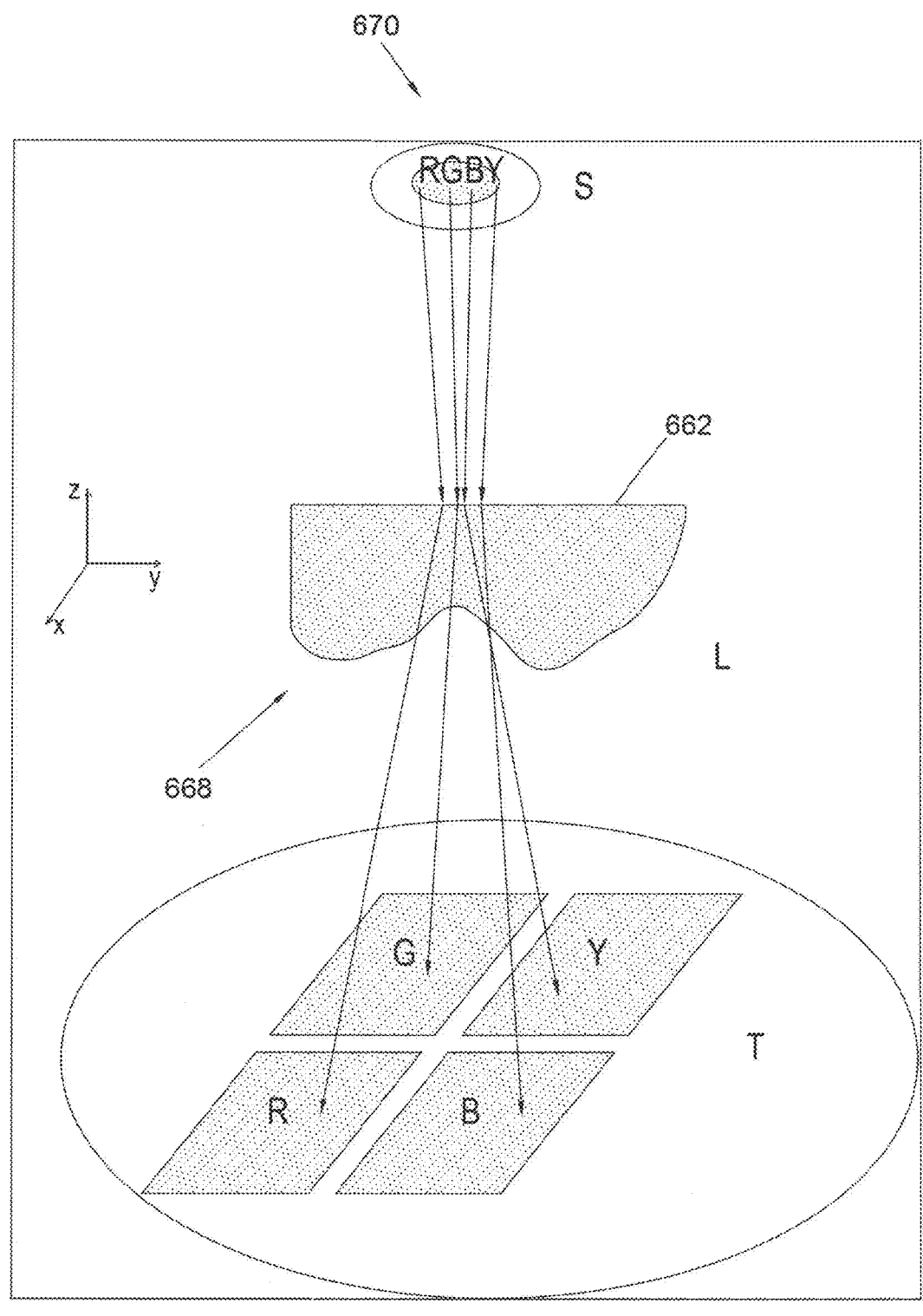
FIG. 8 is a schematic illustrating the operation of a wavelength-selective freeform optical component in a WDM OWC transmitter.

Referring to FIG. 8, there is shown a wavelength-selective freeform optical component 662 having a freeform optical surface 668 which is configured to map or translate or direct beams of different wavelengths (RGBY for red, green, blue, yellow) emitted from a circular emission region of one or more light sources 670 of one or more OWC transmitters in the source plane S to different quadrilateral target regions in a target plane T.

Although not shown explicitly in FIG. 8, like the freeform optical component 562 of FIG. 7B, the freeform optical component 662 comprises a plurality of lenslets arranged in a lenslet array, each lenslet comprising a corresponding lenslet optical surface, wherein at least one of the lenslet optical surfaces is translationally and cylindrically asymmetric, wherein the freeform optical component 662 comprises a three-dimensional freeform optical surface 668 which includes the lenslet optical surfaces. More specifically, the freeform optical surface 668 comprises one or more steps or discontinuities between the lenslet optical surfaces of one or more adjacent pairs of lenslets and/or wherein the freeform optical surface 668 comprises a change in a sign of a gradient of the freeform optical surface 668 between the lenslet optical surfaces of one or more adjacent pairs of lenslets. The height or thickness of the freeform optical component 662 is typically less than 10 mm and preferably less than 5 mm.

In WDM/WDMA OWC applications, use of the freeform optical component 662 allows a multi wavelength beam to be separated at the OWC transmitter end into multiple sub-beams mapped or translated or directed onto target regions in the target plane T in the transmission FOV, for example different regions in a room, allowing for different functionality associated with multiple OWC receivers STA1, STA2, STA3 operating at different wavelengths-such as for example location based reception, multi-channel transmission and/or better interference mitigation for received signals.

It should be understood that the OWC transmitter 550 may comprise a freeform optical component which is configured so as to generate a custom or arbitrary intensity distribution in the reception plane of the transmission FOV. As such, one of skill in the art will understand that use of a freeform optical component provides a greater degree of freedom for performance versus intensity distribution or transmitter shape, particularly in smaller devices or in devices where the optical form factor is dictated by aesthetics.

Figure 9:
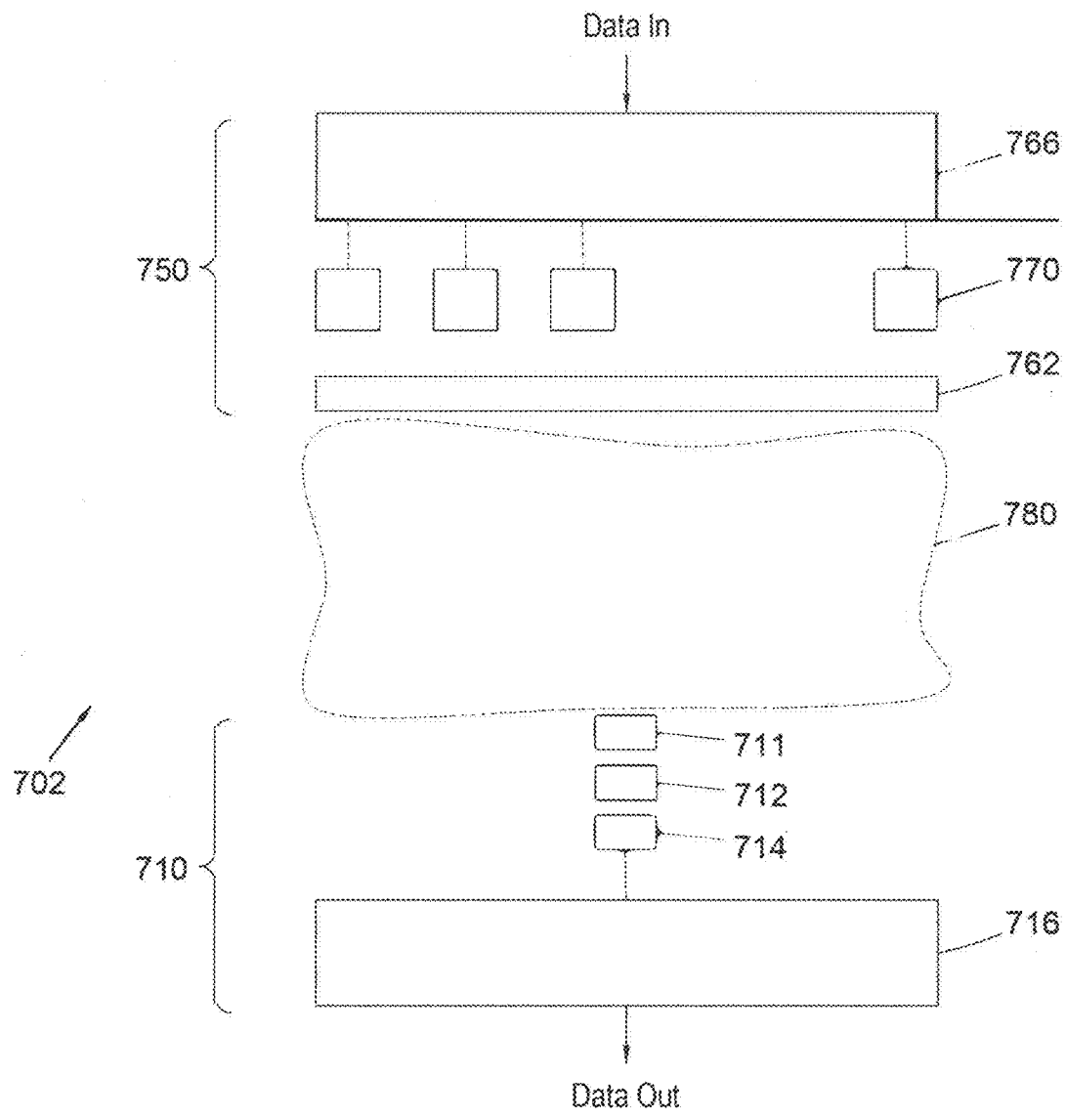
FIG. 9 is a schematic of a space shift keying (SSK) OWC system.

FIG. 9 shows a spatial modulation OWC system generally designated 702 comprising an OWC transmitter generally designated 750, an OWC receiver generally designated 710, and a free-space communication channel 780, wherein the OWC transmitter 750 and the OWC receiver 710 are separated by the free-space communication channel 780.

Figure 10:
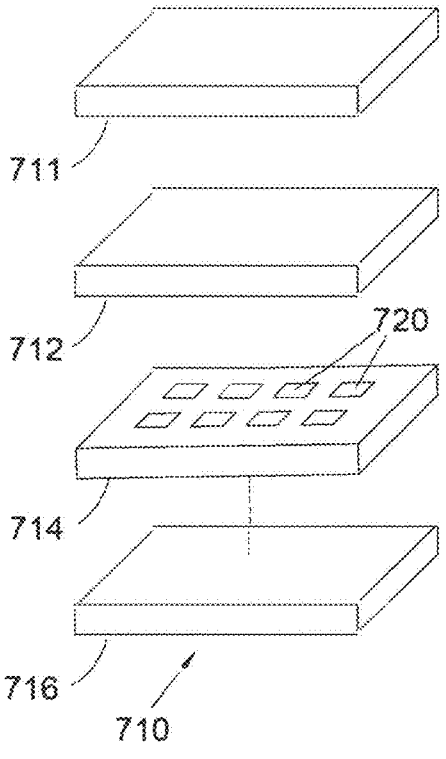
FIG. 10 is a schematic of one example of an OWC receiver of the OWC system of FIG. 9.

The OWC transmitter 750 comprises a plurality of light sources 770 and a spatial modulation encoder 766. The OWC receiver 710 comprises an optical filter 711, a freeform optical component 712, a photodetector 714, and a spatial modulation decoder 716. As shown in more detail in FIG. 10, the photodetector 714 comprises a plurality of light sensitive regions 720 which may be discrete as shown or alternatively at least partially overlapping, wherein each light sensitive region 720 is configured to generate a corresponding electrical signal in response to the incidence of light on the light sensitive region 720. As indicated by the dashed lines between the photodetector 714 and the spatial modulation decoder 716 in FIGS. 9 and 10, the photodetector 714 and the spatial modulation decoder 716 are configured for communication. Moreover, the spatial modulation decoder 716 is configured to process the generated electrical signals electronically.

As will be described in more detail below, the spatial modulation encoder 766 of the OWC transmitter 750 is configured to encode a data signal or data signals on light emitted by the plurality of light sources 770 and the spatial modulation decoder 716 of the OWC receiver 710 is configured to decode the data signal from the electrical signals generated by the light sensitive regions 720 of the photodetector 714.

Specifically, in use, the spatial modulation encoder 766 of the OWC transmitter 750 encodes a data signal or data signals on the light emitted by the plurality of light sources 770 according to a spatial modulation which utilises both the spatial position or index location of each light source 770 relative to another light source 770 as well as the activation sequence of the plurality of light sources 770. Such a spatial modulation technique, for example Space Shift Keying (SSK), uses the spatial positions or index locations and the activation sequence of the light sources 770 to convey data or information.

Each light source 770 of the plurality of light sources 770 has a different spatial position with respect to each of the other light sources 770 so that the plurality of light sources 770 generates a pattern of light source activation or illumination known as an activation pattern which is dependent on the position or relative position of each light source 770. A data signal may be encoded by the activation pattern produced by the plurality of light sources 770 and/or by a series or sequence of different activation patterns produced by the plurality of light sources 770, wherein each activation pattern comprises at least part of the data signal.

To receive and decode the data signals transmitted by such a spatial modulation technique or communication scheme the OWC receiver 710 must be able to distinguish the activation pattern or different activation patterns or be capable of distinguishing signals which represent the activation pattern or patterns of the light received from each light source 770 and be able to decode the data signal or at least part of the data signal encoded within the activation pattern or within an activation pattern series or within signals that represent the activation pattern.

Identifying or distinguishing the activation pattern of the light sources 770 may be at least partly achieved by distinguishing the angles of incidence of light from each light source 770 at the OWC receiver 710 since each light source 770 has a different spatial location and a corresponding angle of incidence to the freeform optical component 712 of the OWC receiver 710. The optical filter 711 has a wavelength response which is dependent on an angle of incidence of light incident on the optical filter 711. Accordingly, distinguishing the angles of incidence of light from the light sources 770 may be assisted by use of the optical filter 711. Light which is incident on the OWC receiver 710 from any one of the light sources 770 of the OWC transmitter 750 is filtered by the optical filter 711 and mapped or translated or directed onto one or more of the light sensitive regions of the photodetector 714 so that the corresponding one or more electrical signals generated by the one or more light sensitive regions depend at least in part on the angle of incidence of light on the optical filter 711 as a consequence of the dependency of the wavelength response of the optical filter 711 on the angle of incidence of light incident on the optical filter 711.

Use of the optical filter 711 may increase the dependency of the generated electrical signals on the angle of incidence. This may enable or improve segregation of light incident on the OWC receiver 710 from different angles of incidence to allow or assist in distinguishing or identifying light from the different light sources 770 of the OWC transmitter 750 and enable distinguishing and decoding of the activation pattern or patterns and associated signals used in the communication of data or information over the free-space communication channel 780 using the spatial modulation technique or communication scheme.

One of ordinary skill in the art will also understand that various modifications are possible to any of the methods described above. For example, although each of the freeform optical components 12, 112, 212, 312, 412 are described above as mapping or translating or directing light from a circular aperture to one or more quadrilateral target regions of a photodetector, in some embodiments of the OWC receiver, the freeform optical component may map or translate or direct light from an aperture of any shape to one or more target regions of any shape.

For example, the freeform optical component may map or translate or direct light from an aperture of a first shape to one or more target regions of a second shape which is different to the first shape. A shape of a perimeter or a contour of light intensity of each of the one or more target regions on the photodetector may be different to a shape of a perimeter or a contour of a corresponding region of incidence of the light on the freeform optical surface.

In some embodiments of the OWC receiver, the freeform optical component may be configured to provide an intensity profile which is non-uniform, for example which has a higher intensity in the centre of the intensity distribution or a higher intensity around the edge of the intensity distribution.

In some embodiments of the OWC receiver, the plurality of lenslets of any of the freeform optical components 12, 112, 212, 312, 412 may comprise a lenslet arrangement or array. The plurality of lenslets of any of the freeform optical components 12, 112, 212, 412 may comprise a core lenslet and a plurality of peripheral lenslets located around at least part of a periphery of the core lenslet. The core lenslet may be centrally located within a group or plurality of peripheral lenslets. The freeform optical component and the photodetector are configured so that light, which is incident on a first region of incidence on, or coinciding with, the core lenslet over a first range of angles of incidence within a FOV of the core lenslet is directed towards and/or onto a corresponding first target region on the photodetector and light which is incident on a second region of incidence on, or coinciding with, a peripheral lenslet over a second range of angles of incidence within a corresponding FOV of the peripheral lenslet is directed towards and/or onto a second target region on the photodetector, and wherein the second target region on the photodetector coincides with, or at least partially overlaps with, the first target region on the photodetector. The second target region may be circularly asymmetric, for example wherein the second target region has a quadrilateral shape. Each of one or more of the peripheral lenslets may comprise a size and/or shape which is different to a size and/or shape of the core lenslet. Each of one or more of the peripheral lenslets may have a surface normal axis at a centre point of the peripheral lenslet surface arranged at a different angle to a surface normal axis at a centre point of the core lenslet optical surface.

Light incident on one or more of the peripheral lenslets and directed to a target region of the photodetector may have a range of angles of incidence which may be adjacent to, or at least partially overlap with, a range of angles of incidence of light which is incident on the core lenslet and which is directed to the target region of the photodetector. The plurality of peripheral lenslets may comprise one or more inner peripheral lenslets and one or more outer peripheral lenslets, wherein the one or more inner peripheral lenslets are located closer to the core lenslet than the one or more outer peripheral lenslets.

In some embodiments of the OWC receiver, the freeform optical component and the light sensitive elements of the photodetector may be configured such that the light signals generated in response to the incidence of light on the light sensitive elements are insensitive to relative rotation between the photodetector and the freeform optical component around an optical axis of the freeform optical component for one or more angles of rotation or rotation of the OWC receiver relative to light incident on the OWC receiver from one or more OWC transmitters for one or more angles of rotation. For example, at least some of the light sensitive elements of the photodetector may be arranged in an arrangement which is at least partially concentric. At least some of the light sensitive elements of the photodetector may be annular in shape. At least some of the light sensitive elements of the photodetector may be annular segments.

The photodetector may comprise a plurality of light sensitive regions, wherein one or more adjacent pairs of the light sensitive regions may be separated by a corresponding gap. Alternatively, one or more adjacent light sensitive regions may be contiguous.

Any of the photodetectors 14, 114, 214, 714 may be configured to detect modulated light. The one or more light sensitive regions of any of the photodetectors 14, 114, 214, 714 may be configured to generate and/or output an electrical signal or signals representative of light incident on the one or more light sensitive regions. For example, any of the photodetectors 14, 114, 214, 714 may comprise at least one photodiode, an array or arrangement of photodiodes, a Si PIN photodiode, a silicon photomultiplier (SiPM), a single photon avalanche diode (SPAD), a Graphene-CMOS high-resolution sensor, or an avalanche photodiode (APD).

The OWC receiver may be configured to detect any wavelength(s) of light suitable for OWC communication. The OWC receiver may be configured to detect one or more of: infra-red light, visible light and ultra-violet light.

In the OWC receiver embodiments described with reference to FIGS. 2A-2C, 3A-3C, 4, 5, 6, 9 and 10 the freeform optical surfaces 18, 118, 218, 318, 418, of the freeform optical component 12, 112, 212, 312, 412 face away from the corresponding photodetector. In other OWC receiver embodiments, the freeform optical surface of the freeform optical component may face towards the corresponding photodetector.

The OWC receiver may form part of an OWC transceiver comprising one or more OWC transmitter(s) and one or more OWC receiver(s).

Although each of the freeform optical components 562, 662 are described above as mapping or translating or directing light from a plurality of light sources, where each light source has a circular emission region, to a plurality of quadrilateral target regions, in some embodiments of the OWC transmitter, the freeform optical component may map or translate or direct light from one or more light sources having an emission region of another shape to one or more target regions of another desired shape. For example, the freeform optical component may map or translate or direct light from a light source having an emission region of a first shape to one or more target regions of a second shape which is different to the first shape. A shape of a perimeter or a contour of each of the one or more target regions may be different to a shape of a perimeter or a contour of a corresponding light emission region.

Similarly although the freeform optical components are described above as mapping or translating or directing light from one or more light sources the one or more light source or sources may have non-uniform characteristic light intensity output(s) and the freeform optical component may map or translate or direct the non-uniform light intensity output of the light source or sources to produce a desired light intensity distribution in the plane of reception located within the OWC transmission field of view.

The OWC transmitter may comprise a light source or emitter capable of transmission of OWC signals. For example, the OWC transmitter may comprise a light emitting diode (LED), an array of LEDs, a laser, for example a VCSEL (vertical-cavity surface-emitting laser), a VCSEL array, or a laser diode, or an LEP (light-emitting plasma). The OWC transmitter may be configured to transmit any wavelength(s) of light suitable for OWC. The OWC transmitter may be configured to transmit one or more of: infra-red light, visible light, and ultra-violet light.

In the OWC transmitter embodiments described with reference to FIGS. 7A-7C and 8, the freeform optical surfaces 568, 668, of the freeform optical component 562, 662 face away from the corresponding light source 570, 670. In other OWC transmitter embodiments, the freeform optical surface of the freeform optical component may face towards the corresponding light source.

OWC may comprise LiFi communication.

OWC may be full-duplex and/or half-duplex.

OWC may be in accordance with an OWC communication protocol.

The OWC transmitters AP1, AP2 may use substantially the same wavelength of light, or substantially the same wavelength range, for OWC. Alternatively the OWC transmitters AP1, AP2 may use different wavelengths of light or different wavelength ranges.

The OWC transmitter may form part of an OWC transceiver comprising one or more OWC transmitter(s) and one or more OWC receiver(s).

The term light herein may be used, for example, to refer to electromagnetic waves with wavelengths in a range which includes ultraviolet, visible light infrared and terahertz. and any other wavelength of light suitable for optical wireless communication.

The OWC transmitters AP1, AP2, and the OWC receivers STA1, STA2, STA3 may support a bi-directional communication protocol. The OWC transmitters AP1, AP2, and the OWC receivers STA1, STA2, STA3 may support any suitable communication protocol, for example IEEE 802.15.7, 802.15.13, 802.11 or extensions or developments thereof; ITU-T G.9960 or extensions or developments thereof; or ITU-T G.vlc, 3GPP or extensions or developments thereof.

Any suitable modulation scheme or schemes may be used for modulation of light by the OWC transmitters AP1, AP2. For example, orthogonal frequency division multiplexing (OFDM) modulation schemes are used in some embodiments, and the demodulation is from the OFDM modulation scheme. In further embodiments and without limitation, other modulation schemes may be used, for example on-off keying (OOK), phase shift keying (PSK), space shift keying (SSK), M-ary pulse amplitude modulation (M-PAM), M-ary quadrature amplitude modulation (M-QAM), Discrete Hartley transformation, Wavelet packet division multiplexing (WPDM), Hadamard coded modulation (HCM), pulse-position modulation (PPM), Colour shift keying (CSK), carrier-less amplitude and phase (CAP), or discrete multi-tone (DMT). The light may be modulated at a modulation rate between 1 kHz and 1 PHz, for example at a modulation rate between 1 MHz and 100 GHz. The modulation scheme or schemes may form part of an OWC protocol, such that the optical signal is produced according to the OWC protocol. The OWC protocol may be packet-based.

Although the disclosure has been described in terms of preferred embodiments as set forth above, it should be understood that these embodiments are illustrative only and that the claims are not limited to those embodiments. Those skilled in the art will be able to make modifications and alternatives to the described embodiments in view of the disclosure which are contemplated as falling within the scope of the appended claims. Each feature disclosed or illustrated in the present specification may be incorporated in any embodiment, whether alone or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

The invention claimed is:

1. An optical wireless communication (OWC) receiver for receiving light encoded with one or more data signals from one or more light sources of one or more OWC transmitters and for generating one or more electrical signals which are representative of the received light, wherein the OWC receiver comprises:
    a photodetector configured to generate the one or more electrical signals comprising one or more light sensitive regions, wherein each light sensitive region is configured to generate a corresponding electrical signal in response to the incidence of light on the light sensitive region; and
    a freeform optical component comprising a plurality of lenslets, each lenslet comprising a corresponding lenslet optical surface,
    wherein at least one of the lenslet optical surfaces is translationally and cylindrically asymmetric,
    wherein the freeform optical component comprises a three-dimensional freeform optical surface which includes the lenslet optical surfaces, and
    wherein the freeform optical component and the photodetector are configured so that the freeform optical component directs at least a portion of the light that is incident on the freeform optical component from the light source onto the photodetector.

2. The OWC receiver as claimed in claim 1, wherein at least one of:
    at least two of the plurality of lenslets have at least one of different refractive indices or different shapes;
    the freeform optical surface comprises one or more steps or discontinuities between the lenslet optical surfaces of one or more adjacent pairs of lenslets; or
    the freeform optical surface comprises a change in a sign of a gradient of the freeform optical surface between the lenslet optical surfaces of one or more adjacent pairs of lenslets.

3. The OWC receiver as claimed in claim 1, wherein the plurality of lenslets comprises a lenslet array comprising:
    a core lenslet; and
    a plurality of peripheral lenslets located outside a periphery of the core lenslet,
    wherein at least one of: a), b), c), d) or e):
    a) one or more of the peripheral lenslets comprises at least one of a size or shape which is different to at least one of a size or shape of the core lenslet;
    b) each of one or more of the peripheral lenslets has a surface normal axis at a centre point of the peripheral lenslet optical surface arranged at a different angle to a surface normal axis at a centre point of the core lenslet optical surface;
    c) light which is incident on one or more of the peripheral lenslets and directed to a target region of the photodetector has a range of angles of incidence which is adjacent to, or at least partially overlaps with, a range of angles of incidence of light which is incident on the core lenslet and which is directed to the target region of the photodetector;
    d) the plurality of peripheral lenslets comprise one or more inner peripheral lenslets and one or more outer peripheral lenslets, wherein the one or more inner peripheral lenslets are located closer to the core lenslet than the one or more outer peripheral lenslets, or
    e) the freeform optical component and the photodetector are configured so that light, which is incident on a first region of incidence on, or coinciding with, the core lenslet over a first range of angles of incidence is directed onto a corresponding first target region on the photodetector, and light which is incident on a second region of incidence on, or coinciding with, a peripheral lenslet over a second range of angles of incidence is directed onto a second target region on the photodetector, wherein the second target region on the photodetector coincides with, or at least partially overlaps with, at least one of the first target region on the photodetector or the second target region is circularly asymmetric, for example wherein the second target region has a polygon shape.

4. The OWC receiver as claimed in claim 1, wherein the freeform optical component and the photodetector are configured so that the freeform optical component maps or translates or directs light that is incident on each of one or more regions of incidence of the freeform optical surface over a corresponding range of angles of incidence onto one or more target regions on the photodetector, and wherein a shape of a perimeter or a contour of each of the one or more target regions on the photodetector is different to a shape of a perimeter or a contour of each of the one or more regions of incidence of the freeform optical surface.

5. The OWC receiver as claimed in claim 1, at least one of:
    wherein the freeform optical component and the photodetector are configured so that the freeform optical component maps or translates or directs light that is incident on each of one or more regions of incidence of the freeform optical surface over a corresponding range of angles of incidence onto one or more target regions on the photodetector, wherein one or more of the target regions at least partly matches one or more of the light sensitive regions in at least one of position, shape or size, or at least partially overlaps with one or more of the light sensitive regions, or
    wherein each target region matches a corresponding light sensitive region in at least one of position, shape or size, or at least partially overlaps with a corresponding light sensitive region.

6. The OWC receiver as claimed in claim 5, at least one of
    wherein the freeform optical component and the photodetector are configured so that a strength or magnitude of an electrical signal generated by each of one or more of the light sensitive regions in response to the incidence of light on each of one or more of the light sensitive regions is independent of an angle of incidence of the light on the region of incidence of the freeform optical surface when the angle of incidence is within a limited range of angles of incidence, or
    wherein the freeform optical component and the photodetector are configured so that each of one or more of the target regions is larger or smaller than each of one or more of the light sensitive regions.

7. The OWC receiver as claimed in claim 5, wherein the freeform optical component and the photodetector are configured so that:

the freeform optical component maps or translates or directs desired light that is incident on each of one or more regions of incidence of the freeform optical surface at a desired angle of incidence onto one or more target regions on the photodetector which at least partially overlap one or more of the light sensitive regions, and the freeform optical component maps or translates or directs undesired light that is incident on each of one or more regions of incidence of the freeform optical surface at an undesired angle of incidence onto one or more target regions on the photodetector which do not overlap any of the light sensitive regions.

8. The OWC receiver as claimed in claim 5, wherein the one or more light sensitive regions comprise a plurality of light sensitive regions, wherein each light sensitive region is configured to generate a corresponding electrical signal in response to the incidence of light on the light sensitive region, and wherein the OWC receiver is configured to perform at least one of the following:

associate the electrical signals generated by different light sensitive regions with light incident on the freeform optical surface at corresponding different angles of incidence, determine the angle of incidence of the light incident on the freeform optical surface based on the electrical signals generated by the plurality of the light sensitive regions; or distinguish between light which is incident on the freeform optical surface from a plurality of different angles of incidence based on the electrical signals generated by the plurality of light sensitive regions.

9. The OWC receiver as claimed in claim 5, comprising a decoder for at least one of decoding or determining, from the one or more generated electrical signals, at least part of the one or more data signals encoded on the light received by the OWC receiver from the one or more light sources of the one or more OWC transmitters.

10. The OWC receiver as claimed in claim 9, wherein the OWC receiver is configured for receiving light from a plurality of light sources of one or more OWC transmitters, the light from each light source being encoded with a corresponding data signal, wherein the OWC receiver is configured so that the freeform optical component maps or translates or directs light received from at least one light source of the plurality of light sources onto one or more corresponding different light sensitive regions and at least one of the one or more different light sensitive regions generates a corresponding electrical signal, and at least one of:

wherein the decoder is configured to decode a data signal from one or more of the generated electrical signals, each decoded data signal representing at least part of the corresponding data signal transmitted by the corresponding light source to the OWC receiver, or wherein two or more of the data signals encoded on the light emitted by the plurality of light sources are the same or different.

11. The OWC receiver as claimed in claim 9, wherein the OWC receiver is configured for receiving light from a plurality of light sources of one or more OWC transmitters, the light from each light source being encoded with the same data signal, wherein the OWC receiver is configured so that the freeform optical component maps or translates or directs the light received from different light sources of the plurality of light sources onto one or more light sensitive regions and each light sensitive region generates a corresponding electrical signal, and wherein the decoder is configured to decode a data signal from one or more of the generated electrical signals, or to decode a data signal from a sum or a weighted sum of the electrical signals generated by two or more of the light sensitive regions, the decoded data signal representing at least part of the data signal transmitted by the plurality of light sources to the OWC receiver.

12. The OWC receiver of claim 9, wherein a data signal is encoded on the light emitted by a plurality of light sources according to a modulation technique where the encoding of the at least part of the data signal is dependent on an activation pattern of the plurality of light sources, wherein the decoder is configured to distinguish the activation pattern or signals representing the activation pattern of the plurality of light sources from the electrical signals generated by the plurality of light sensitive regions of the photodetector and to decode at least part of the data signal encoded on the activation pattern or the signals representing the activation pattern of the light emitted by the plurality of light sources.

13. The OWC receiver as claimed in claim 9, comprising an optical filter, wherein the optical filter has a wavelength response which is dependent on an angle of incidence of light incident on the optical filter, and wherein the OWC receiver is configured so that light which is incident on the OWC receiver from a light source of an OWC transmitter is filtered by the optical filter and mapped or translated or directed onto one or more of the light sensitive regions of the photodetector so that the corresponding one or more electrical signals generated by the one or more light sensitive regions depend at least in part on the angle of incidence of light on the optical filter as a consequence of the dependency of the wavelength response of the optical filter on the angle of incidence of light incident on the optical filter.

14. The OWC receiver as claimed in claim 9, wherein the OWC receiver is configured for receiving light from a plurality of light sources of one or more OWC transmitters, the light from each light source being encoded with a corresponding data signal or the light from the plurality of light sources being encoded with a data signal, wherein the OWC receiver is configured so that the freeform optical component maps or translates or directs light received from each light source of the plurality of light sources onto one or more different light sensitive regions, and each of the one or more different light sensitive regions generates a corresponding electrical signal, and wherein the decoder is configured to decode, from the one or more generated electrical signals, at least part of the corresponding data signal encoded on the light from each light source or at least part of the data signal encoded on the light from the plurality of light sources, and wherein the OWC receiver is configured to:

characterize each generated electrical signal as a desired electrical signal or an undesired electrical signal based at least part on the one or more decoded data signals; and isolate, reject, remove, or at least partially reduce, suppress or attenuate, one or more of the undesired electrical signals so as to at least partially reduce or suppress interference between at least one of the desired electrical signals and at least one of the undesired electrical signals.

15. The OWC receiver as claimed in claim 1, wherein at least one of:
the freeform optical component is formed integrally or monolithically with the photodetector or a photodetector housing;
the photodetector forms part of, or is integrated with, or comprises, an ASIC;
the OWC receiver comprises one or more optical elements which are additional to the freeform optical component,
wherein the one or more optical elements comprise an optically transparent or semi-transparent cover or filter or coating of the freeform optical component, or
wherein the optically transparent or semi-transparent cover or filter comprises a portion of a transparent or partially or semi-transparent display.

16. The OWC receiver as claimed in claim 1, at least one of:
wherein the OWC receiver is configured to receive light of different wavelengths,
wherein each wavelength is encoded with a corresponding data signal or a corresponding part of a data signal using wavelength division multiplexing (WDM) or wavelength division multiple access (WDMA), and wherein the freeform optical component and the photodetector are configured so that the freeform optical component directs at least a portion of the light at each wavelength that is incident on the freeform optical surface onto a corresponding target region or regions of the photodetector, or
wherein the OWC receiver is configured to distinguish between the data signals encoded on the different wavelengths or the different parts of the data signal encoded on the different wavelengths.

17. An electronic device comprising a transparent or semi-transparent display and an OWC receiver, wherein the OWC receiver comprises an OWC receiver as claimed in claim 1.

18. The electronic device as claimed in claim 17, wherein at least one of:
at least part of the OWC receiver is located behind the display;
the electronic device is configured so that a photodetector of the OWC receiver receives light after the light is transmitted through the display; or
a freeform optical component of the OWC receiver forms part of the display, is formed integrally with the display, or is monolithically integrated with the display.

19. An optical wireless communication (OWC) transmitter for transmitting light encoded with at least part of a data signal, the OWC transmitter comprising:
a light source for emitting light which is encoded with at least part of the data signal; and
a freeform optical component comprising a plurality of lenslets, each lenslet comprising a corresponding lenslet optical surface,
wherein at least one of the lenslet optical surfaces is translationally and cylindrically asymmetric,
wherein the freeform optical component comprises a three-dimensional freeform optical surface which includes the lenslet optical surfaces, and wherein the light source and the freeform optical component are configured so that the freeform optical component directs at least a portion of the light that is incident on the freeform optical component from the light source through a OWC transmission field of view.

20. An OWC system, comprising one or more OWC transmitters, and one or more OWC receivers as claimed in claim 1.

21. The electronic device as claimed in claim 18, comprising an OWC transmitter as claimed in claim 19, wherein at least one of:
at least part of the OWC transmitter is located behind the display;
the electronic device is configured so that light from a light source of the OWC transmitter is transmitted through the display; or
a freeform optical component of the OWC transmitter forms part of the display, is formed integrally with the display, or is monolithically integrated with the display.

22. The OWC transmitter as claimed in claim 19, wherein at least one of:
at least two of the plurality of lenslets have at least one of different refractive indices or different shapes;
the freeform optical surface comprises one or more steps or discontinuities between the lenslet optical surfaces of one or more adjacent pairs of lenslets; or
the freeform optical surface comprises a change in a sign of a gradient of the freeform optical surface between the lenslet optical surfaces of one or more adjacent pairs of lenslets.

23. The OWC transmitter as claimed in claim 19, wherein the plurality of lenslets comprises a lenslet array or arrangement comprising: a core lenslet; and a plurality of peripheral lenslets located outside a periphery of the core lenslet,
wherein at least one of: a), b), c), or d):
a) one or more of the peripheral lenslets comprises at least one of a size or shape which is different to a size and/or shape of the core lenslet;
b) each of one or more of the peripheral lenslets has a surface normal axis at a centre point of the peripheral lenslet optical surface arranged at a different angle to a surface normal axis at a centre point of the core lenslet optical surface;
c) a FOV of each of one or more of the peripheral lenslets is adjacent to, or at least partially overlaps with, a FOV of the core lenslet; or
d) the plurality of peripheral lenslets comprise one or more inner peripheral lenslets and one or more outer peripheral lenslets, wherein the one or more inner peripheral lenslets are located closer to the core lenslet than the one or more outer peripheral lenslets.

24. The OWC transmitter as claimed in claim 19, at least one of:
wherein the light source and the freeform optical component are configured so that the freeform optical component directs at least a portion of the light that is incident on the freeform optical component from the light source so as to provide a desired intensity distribution in a plane of reception located within the OWC transmission field of view,
wherein the desired intensity distribution has a desired shape, perimeter or contour in the plane of reception located within the OWC transmission field of view, or
wherein the desired intensity distribution in the plane of reception located within the OWC transmission field of view is a desired uniform intensity distribution.

25. The OWC transmitter as claimed in claim 19, comprising:

a plurality of light sources, the plurality of light sources including the light source; and at least one freeform optical component, the at least one freeform optical component including the freeform optical component, wherein each light source is configured to emit light which is encoded at least one of with at least part of a data signal or with a corresponding data signal, wherein each freeform optical component comprises a corresponding plurality of lenslets, each lenslet comprising a corresponding lenslet optical surface, wherein at least one of the lenslet optical surfaces of each freeform optical component is translationally and cylindrically asymmetric, wherein each freeform optical component comprises a corresponding three-dimensional freeform optical surface which includes the corresponding lenslet optical surfaces, and wherein the plurality of light sources and the at least one freeform optical component are configured so that the at least one freeform optical component directs at least a portion of the light that is incident on the at least one freeform optical component from one or more of the light sources so as to provide a corresponding desired intensity distribution in a plane of reception located within the OWC transmission field of view, or wherein the plurality of light sources and the at least one freeform optical component are configured so that the at least one freeform optical component directs at least a portion of the light that is incident on the at least one freeform optical component from one or more of the light sources so as to provide a corresponding desired intensity distribution in a plane of reception located within a plurality of OWC transmission fields of view, the plurality of OWC transmission fields of view including the OWC transmission field of view.

26. The OWC transmitter as claimed in claim 25, at least one of:

wherein the desired intensity distribution corresponding to at least one light source comprises a desired intensity distribution in the plane of reception, wherein the desired intensity distribution corresponding to at least one light source has a desired shape, perimeter or contour in the plane of reception, wherein the shape is a round, square, rectangular, quadrilateral, hexagonal, polygon or any other symmetric or asymmetric shape, perimeter or contour, or wherein the desired intensity distribution corresponding to at least one light source is a uniform intensity distribution.

27. The OWC transmitter as claimed in claim 25, at least one of:

wherein at least two of the light sources are configured to emit light of a different wavelength or to emit light having a different range of wavelengths, wherein each wavelength is encoded with a corresponding data signal or a corresponding part of a data signal using wavelength division multiplexing (WDM) or wavelength division multiple access (WDMA), or wherein the freeform optical component and the plurality of light sources are configured so that the freeform optical component directs at least a portion of the light at each wavelength that is incident on the freeform optical surface onto a corresponding OWC transmission field of view.

28. An OWC system, comprising a plurality of OWC transmitters, wherein each OWC transmitter comprises an OWC transmitter as claimed in claim 17, wherein each OWC transmitter produces a corresponding desired intensity distribution in a plane of reception located within a corresponding OWC transmission field of view, and wherein at least one of: the plurality of OWC transmission fields of view together form a combined field of view, there is no or minimum light signal overlap between at least two of the OWC transmission fields of view, the OWC transmission fields of view form a tessellation pattern covering the combined field of view, or wherein the intensity distribution in the plane of reception produced by at least one OWC transmitter comprises a uniform intensity distribution.

29. An electronic device comprising a transparent or semi-transparent display and an OWC transmitter, wherein the OWC transmitter comprises an OWC transmitter as claimed in claim 19.

30. An OWC system, comprising one or more OWC transmitters as claimed in claim 19, and one or more OWC receivers.

31. The electronic device as claimed in claim 29, wherein at least one of:

at least part of the OWC transmitter is located behind the display;

the electronic device is configured so that light from a light source of the OWC transmitter is transmitted through the display; or a freeform optical component of the OWC transmitter forms part of the display, is formed integrally with the display, or is monolithically integrated with the display.

32. The electronic device as claimed in claim 31, comprising an OWC receiver as claimed in claim 1, wherein at least one of:

at least part of the OWC receiver is located behind the display;

the electronic device is configured so that a photodetector of the OWC receiver receives light after the light is transmitted through the display; or a freeform optical component of the OWC receiver forms part of the display, is formed integrally with the display, or is monolithically integrated with the display.

\* \* \* \* \*